(12) United States Patent
Hashimoto

(10) Patent No.: US 10,656,390 B2
(45) Date of Patent: May 19, 2020

(54) IMAGING LENS

(71) Applicant: KANTATSU CO., LTD., Yaita-shi, Tochigi (JP)

(72) Inventor: Masaya Hashimoto, Sukagawa (JP)

(73) Assignee: KANTATSU CO., LTD., Yaita-shi (JP)

(*) Notice: Subject to any disclaimer, the term of this patent is extended or adjusted under 35 U.S.C. 154(b) by 0 days.

(21) Appl. No.: 16/259,662

(22) Filed: Jan. 28, 2019

(65) Prior Publication Data
US 2019/0154998 A1 May 23, 2019

Related U.S. Application Data

(63) Continuation of application No. 14/736,604, filed on Jun. 11, 2015, now Pat. No. 10,191,248.

(30) Foreign Application Priority Data

Oct. 29, 2014 (JP) .................. 2014-220092

(51) Int. Cl.
*G02B 13/00* (2006.01)
*G02B 9/64* (2006.01)
*G02B 13/18* (2006.01)

(52) U.S. Cl.
CPC .......... *G02B 13/0045* (2013.01); *G02B 9/64* (2013.01); *G02B 13/18* (2013.01)

(58) Field of Classification Search
CPC .............................. G02B 13/0045; G02B 9/64
USPC ................................................. 359/708, 755
See application file for complete search history.

(56) References Cited

U.S. PATENT DOCUMENTS

| 8,599,495 B1 | 12/2013 | Tsai et al. |
| 9,348,113 B2 | 5/2016 | Tang et al. |
| 9,366,847 B2 | 6/2016 | Chen et al. |
| 9,423,595 B2 | 8/2016 | Shinohara et al. |

(Continued)

FOREIGN PATENT DOCUMENTS

| JP | 2012-155223 A | 8/2012 |
| JP | 2015-072405 A | 4/2015 |

(Continued)

OTHER PUBLICATIONS

Jun. 4, 2018, Office Action issued in Japanese Patent Application No. 2014-220092.
JP 2015072403 Machine Translation; Apr. 16, 2015.

*Primary Examiner* — Zachary W Wilkes
(74) *Attorney, Agent, or Firm* — Hamre, Schumann, Mueller & Larson, P.C.

(57) ABSTRACT

A compact low-profile low-cost imaging lens with a small F-value which offers a wide field of view and corrects aberrations properly. Its elements are spaced from each other and arranged from an object side to an image side as follows: a first positive lens having a convex object-side surface; a second negative lens; a third positive or negative lens; a fourth positive or negative lens; a fifth positive or negative lens; a sixth positive or negative lens; and a seventh lens as a double-sided aspheric lens having a concave image-side surface. The third to sixth lenses each have at least one aspheric surface. The aspheric image-side surface of the seventh lens has a pole-change point off an optical axis. The imaging lens satisfies a conditional expression $-1.0 < f1/f2 < -0.15$, where f1 denotes focal length of the first lens, and f2 denotes focal length of the second lens.

11 Claims, 16 Drawing Sheets

(56) References Cited

U.S. PATENT DOCUMENTS

| | | |
|---|---|---|
| 2013/0050846 A1 | 2/2013 | Huang et al. |
| 2014/0376105 A1 | 12/2014 | Sekine |
| 2015/0009578 A1 | 1/2015 | Shinohara et al. |
| 2015/0103414 A1 | 4/2015 | Baik |
| 2015/0198787 A1 | 7/2015 | Kubota et al. |
| 2015/0198791 A1 | 7/2015 | Kubota et al. |
| 2015/0247990 A1 | 9/2015 | Kubota et al. |
| 2015/0268448 A1 | 9/2015 | Kubota et al. |
| 2015/0378131 A1 | 12/2015 | Tang et al. |
| 2016/0033742 A1 | 2/2016 | Huang |
| 2016/0241756 A1 | 8/2016 | Chen |
| 2016/0282587 A1 | 9/2016 | Hashimoto et al. |

FOREIGN PATENT DOCUMENTS

| | | |
|---|---|---|
| JP | 2015072403 A | 4/2015 |
| JP | 2015-132660 A | 7/2015 |
| JP | 2015-132664 A | 7/2015 |
| JP | 2015-179228 A | 10/2015 |

IMAGING LENS

The present application is based on and claims priority of Japanese patent application No. 2014-220092 filed on Oct. 29, 2014, the entire contents of which are hereby incorporated by reference.

BACKGROUND OF THE INVENTION

Field of the Invention

The present invention relates to an imaging lens which forms an image of an object on a solid-state image sensor such as a CCD sensor or a C-MOS sensor used in a compact image pickup device, and more particularly to an imaging lens which is built in an image pickup device mounted in an increasingly compact and low-profile mobile terminal such as a smartphone, mobile phone, tablet or PDA (Personal Digital Assistant), or a game console, or an information terminal such as a PC, or a highly functional product such as a home appliance with a camera function.

Description of the Related Art

In recent years, there has been a general tendency that many information terminals have a camera function. Also, home appliances with a camera are becoming widely used. For example, by telecommunication between a home appliance and a smartphone, a user away from home can monitor in real time what is going on at home or check how his/her child or pet is at home or control the home appliance to optimize its operation. Furthermore, wearable devices, such as glasses with a camera function and wrist watches with a camera function, have appeared in the market. It is thought that a variety of high value-added products which enhance consumer convenience and consumer satisfaction will be increasingly developed in the future by adding a camera function to various existing products. The cameras mounted in such products are required not only to provide high resolution to cope with an increase in the number of pixels but also to be compact and low-profile and offer high brightness and a wide field of view.

However, in order to provide a low-profile imaging lens with high brightness and a wide field of view as described above, the problem with difficulty in correction of aberrations in the peripheral area of an image has to be addressed, and unless the problem is solved, it will be difficult to deliver high imaging performance throughout the image.

With the recent trend toward image sensors which deal with an increasing number of pixels, an imaging lens composed of seven constituent lenses is expected to properly correct such aberrations in the peripheral area of an image that cannot be corrected properly by an imaging lens composed of six constituent lenses and also thought to have potential to correct various aberrations properly and achieve compactness, a small F-value and a wide field of view in a balanced manner. For example, the imaging lens described in JP-A-2012-155223 (Patent Document 1) is known as such an imaging lens composed of seven constituent lenses.

Patent Document 1 discloses an imaging lens which includes, in order from an object side, a first biconvex lens, a second biconcave lens cemented with the first lens, a third negative meniscus lens having a convex surface on the object side, a fourth positive meniscus lens having a concave surface on the object side, a fifth negative meniscus lens having a convex surface on the object side, a sixth biconvex lens, and a seventh biconcave lens. In this imaging lens, the ratio between the focal length of the front lens group composed of the first to fourth lenses and the focal length of the back lens group composed of the fifth to seventh lenses is kept within a prescribed range so that the optical system is compact and various aberrations are corrected properly.

The imaging lens composed of seven constituent lenses as described in Patent Document 1 corrects various aberrations properly and offers relatively high brightness with an F-value from 2.09 to 2.35 and a relatively wide field of view of 33 degrees. However, the total track length is longer than the diagonal length of the effective imaging plane of the image sensor, so that it is difficult to apply the imaging lens to a device which is strongly expected to be compact and low-profile. If this lens system is designed to offer a wider field of view and higher brightness, it would be unable to correct aberrations in the peripheral area properly. Consequently, it would be difficult to reduce image artifacts throughout the image effectively and ensure high image quality. Furthermore, the manufacture of a cemented lens requires high precision manufacturing techniques because it involves troublesome alignment and lamination steps, so that it is difficult to mass-produce the imaging lens at low cost with high productivity.

As mentioned above, in the conventional art, it is difficult to provide a low-profile low-cost imaging lens which offers high brightness, high resolution and a wide field of view.

SUMMARY OF THE INVENTION

The present invention has been made in view of the above problem, and an object thereof is to provide a compact low-cost imaging lens which meets the demand for low-profileness, offers high brightness and a wide field of view and corrects various aberrations properly.

Here, "low-profile" implies that total track length is shorter than the diagonal length of the effective imaging plane of the image sensor and "wide field of view" implies that the field of view is 70 degrees or more. The diagonal length of the effective imaging plane of the image sensor is considered equal to the diameter of an effective image circle whose radius is the maximum image height, that is, the vertical height from an optical axis to the point where a light ray incident on the imaging lens at a maximum field of view enters the image plane.

In the present invention, a convex surface or a concave surface means that the paraxial portion of the surface (portion near the optical axis) is convex or concave. A "pole-change point" on an aspheric surface means a point on the aspheric surface at which a tangential plane intersects the optical axis perpendicularly. The values of total track length and back focus are defined to express distances on the optical axis in which an optical element such as an IR cut filter or cover glass is removed.

In order to address the above problem, according to an aspect of the present invention, there is provided an imaging lens composed of seven constituent lenses which forms an image of an object on a solid-state image sensor, in which the lenses are arranged in order from an object side to an image side as follows: a first lens with positive refractive power having a convex surface on the object side; a second lens with negative refractive power; a third lens with positive or negative refractive power; a fourth lens with positive or negative refractive power; a fifth lens with positive or negative refractive power; a sixth lens with positive or negative refractive power; and a seventh lens as a double-sided aspheric lens having a concave surface on the image side.

These constituent lenses are spaced from each other. The third to sixth lenses each have at least one aspheric surface, and the seventh lens has pole-change points off an optical axis on the aspheric image-side surface. The imaging lens satisfies a conditional expression (1) below:

$$-1.0<f1/f2<-0.15 \quad (1)$$

where f1 denotes the focal length of the first lens, and f2 denotes the focal length of the second lens.

In the imaging lens composed of seven constituent lenses, the first lens has strong refractive power to achieve low-profileness and the second lens corrects spherical aberrations and chromatic aberrations properly. The third lens, the fourth lens, the fifth lens, and the sixth lens each have at least one aspheric surface and are given appropriated positive or negative refractive power to ensure low-profileness and a wide field of view and correct off-axial aberrations such as astigmatism, field curvature and distortion. The seventh lens, a lens with positive or negative refractive power having a concave surface on the image side, corrects spherical aberrations and field curvature and distortion in the peripheral area using its aspheric surfaces. Also, since the image-side surface of the seventh lens has an aspheric shape with pole-change points, the angle of rays incident on the image sensor is controlled appropriately.

In the present invention, no cemented lens is used and all the constituent lenses are spaced from each other so that the number of aspheric surfaces can be increased to correct aberrations properly and deliver higher performance.

The conditional expression (1) defines an appropriate range for the ratio of the focal length of the first lens to the focal length of the second lens, and indicates a condition to achieve low-profileness and correct chromatic aberrations properly. If the value is above the upper limit of the conditional expression (1), the refractive power of the first lens would be too strong for the second lens to properly correct chromatic aberrations which occur on the first lens, though it would be advantageous in shortening the total track length. On the other hand, if the value is below the lower limit of the conditional expression (1), the refractive power of the first lens would be too weak to shorten the total track length.

If the fifth lens has positive refractive power and the sixth lens has negative refractive power, preferably the imaging lens according to the present invention satisfies a conditional expression (2) below:

$$0.5<f5/f<1.5 \quad (2)$$

where f: focal length of the overall optical system of the imaging lens, and f5: focal length of the fifth lens.

The conditional expression (2) defines an appropriate range for the ratio of the focal length of the fifth lens to the focal length of the overall optical system of the imaging lens, and indicates a condition to achieve low-profileness and correct spherical aberrations and coma aberrations properly, provided that the fifth lens has positive refractive power and the sixth lens has negative refractive power. If the value is above the upper limit of the conditional expression (2), the refractive power of the fifth lens would be too weak to shorten the total track length. On the other hand, if the value is below the lower limit of the conditional expression (2), the refractive power of the fifth lens would be too strong and spherical aberrations and coma aberrations would increase, thereby making it difficult to correct aberrations, though it would be advantageous in shortening the total track length.

If the fifth lens has positive refractive power and the sixth lens has negative refractive power, preferably the imaging lens according to the present invention satisfies a conditional expression (3) below:

$$-8.0<f6/f<-1.0 \quad (3)$$

where f: focal length of the overall optical system of the imaging lens, and f6: focal length of the sixth lens.

The conditional expression (3) defines an appropriate range for the ratio of the focal length of the sixth lens to the focal length of the overall optical system of the imaging lens, and indicates a condition to achieve low-profileness and correct chromatic aberrations properly, provided that the fifth lens has positive refractive power and the sixth lens has negative refractive power. If the value is above the upper limit of the conditional expression (3), the negative refractive power of the sixth lens would be too strong to shorten the total track length. On the other hand, if the value is below the lower limit of the conditional expression (3), the negative refractive power of the sixth lens would be too weak to correct chromatic aberrations properly.

If the fifth lens has negative refractive power and the sixth lens has positive refractive power, preferably the imaging lens according to the present invention satisfies a conditional expression (4) below:

$$-20<f5/f<-1.0 \quad (4)$$

where f: focal length of the overall optical system of the imaging lens, and f5: focal length of the fifth lens.

The conditional expression (4) defines an appropriate range for the ratio of the focal length of the fifth lens to the focal length of the overall optical system of the imaging lens, and indicates a condition to achieve low-profileness and correct astigmatism and field curvature properly, provided that the fifth lens has negative refractive power and the sixth lens has positive refractive power. If the value is above the upper limit of the conditional expression (4), the negative refractive power of the fifth lens would be too strong to shorten the total track length. On the other hand, if the value is below the lower limit of the conditional expression (4), the negative refractive power of the fifth lens would be too weak to correct astigmatism and field curvature.

If the fifth lens has negative refractive power and the sixth lens has positive refractive power, preferably the imaging lens according to the present invention satisfies a conditional expression (5) below:

$$1.0<f6/f<3.0 \quad (5)$$

where f: focal length of the overall optical system of the imaging lens, and f6: focal length of the sixth lens.

The conditional expression (5) defines an appropriate range for the ratio of the focal length of the sixth lens to the focal length of the overall optical system of the imaging lens, and indicates a condition to achieve low-profileness and correct spherical aberrations and distortion properly, provided that the fifth lens has negative refractive power and the sixth lens has positive refractive power. If the value is above the upper limit of the conditional expression (5), the positive refractive power of the sixth lens would be too weak to shorten the total track length. On the other hand, if the value is below the lower limit of the conditional expression (5), the positive refractive power of the sixth lens would be too strong and spherical aberrations and distortion would increase, thereby making it difficult to correct aberrations, though it would be advantageous in shortening the total track length.

Preferably, the imaging lens according to the present invention satisfies conditional expressions (6) to (8) below:

$$20 < vd1 - vd2 < 40 \quad (6)$$

$$40 < vd3 < 75 \quad (7)$$

$$40 < vd7 < 75 \quad (8)$$

where
vd1: Abbe number of the first lens at d-ray,
vd2: Abbe number of the second lens at d-ray,
vd3: Abbe number of the third lens at d-ray, and
vd7: Abbe number of the seventh lens at d-ray.

The conditional expression (6) defines an appropriate range for the difference between the Abbe numbers of the first and second lenses at d-ray, the conditional expression (7) defines an appropriate range for the Abbe number of the third lens at d-ray, and the conditional expression (8) defines an appropriate range for the Abbe number of the seventh lens at d-ray, and these conditional expressions indicate conditions to correct chromatic aberrations properly. The conditional expression (6) suggests that when low-dispersion material is used for the first lens and high-dispersion material is used for the second lens, chromatic aberrations which occur on the first lens are corrected properly. The conditional expressions (7) and (8) suggest that low-dispersion material is used for the third lens and seventh lens, chromatic aberrations of magnification are suppressed.

If the fifth lens has positive refractive power, preferably the imaging lens according to the present invention satisfies conditional expressions (9) and (10) below:

$$40 < vd4 < 75 \quad (9)$$

$$20 < |vd5 - vd6| < 40 \quad (10)$$

where
vd4: Abbe number of the fourth lens at d-ray,
vd5: Abbe number of the fifth lens at d-ray, and
vd6: Abbe number of the sixth lens at d-ray.

The conditional expression (9) defines an appropriate range for the Abbe number of the fourth lens at d-ray, and indicates a condition to correct chromatic aberrations properly. When low-dispersion material is used for the fourth lens, chromatic aberrations of magnification are suppressed.

The conditional expression (10) defines an appropriate range for the difference between the Abbe numbers of the fifth lens and the sixth lens at d-ray, and indicates a condition to correct chromatic aberrations properly. When low-dispersion material and high-dispersion material are combined for the fifth lens and the sixth lens, chromatic aberrations of magnification and axial chromatic aberrations are suppressed.

If the fifth lens has negative refractive power, preferably the imaging lens according to the present invention satisfies conditional expressions (11) and (12) below:

$$20 < |vd4 - vd5| < 40 \quad (11)$$

$$40 < vd6 < 75 \quad (12)$$

where
vd4: Abbe number of the fourth lens at d-ray,
vd5: Abbe number of the fifth lens at d-ray, and
vd6: Abbe number of the sixth lens at d-ray.

The conditional expression (11) defines an appropriate range for the difference between the Abbe numbers of the fourth lens and the fifth lens at d-ray, and indicates a condition to correct chromatic aberrations properly. When low-dispersion material and high-dispersion material are combined for the fourth lens and the fifth lens, chromatic aberrations of magnification and axial chromatic aberrations are suppressed.

The conditional expression (12) defines an appropriate range for the Abbe number of the sixth lens at d-ray, and indicates a condition to correct chromatic aberrations properly. When low-dispersion material is used for the sixth lens, chromatic aberrations of magnification are suppressed.

The conditional expressions (6) to (12) suggest that inexpensive plastic materials may be used for the constituent lenses. This makes it easy to reduce the cost of the imaging lens.

Preferably, the imaging lens according to the present invention satisfies conditional expressions (13) and (14) below:

$$1.0 < TTL/f < 1.35 \quad (13)$$

$$TTL/2ih < 1.0 \quad (14)$$

where
f: focal length of the overall optical system of the imaging lens,
TTL: distance on the optical axis from an object-side surface of an optical element located nearest to the object to the image plane with a filter, etc. removed (total track length), and
ih: maximum image height.

The conditional expression (13) defines an appropriate range for the ratio of total track length to the focal length of the overall optical system of the imaging lens, and indicates a condition to achieve low-profileness and correct various aberrations properly. If the value is above the upper limit of the conditional expression (13), the total track length would be too long to achieve low-profileness, though the freedom in the shape of each constituent lens would increase, thereby making it easier to correct various aberrations. On the other hand, if the value is below the lower limit of the conditional expression (13), the total track length would be too short and the freedom in the shape of each constituent lens would decrease, thereby making it difficult to correct various aberrations.

The conditional expression (14) defines an appropriate relation between total track length and maximum image height, and indicates a condition to make the imaging lens low-profile. When the value is below the upper limit of the conditional expression (14), the total track length is shorter than the diagonal length of the effective imaging plane of the image sensor, and the imaging lens can meet the recent demand for low-profileness.

If the fifth lens has positive refractive power and the sixth lens has negative refractive power, preferably the imaging lens according to the present invention satisfies conditional expressions (15) and (16) below:

$$0.4 < f345/f < 1.2 \quad (15)$$

$$-1.0 < f67/f < -0.3 \quad (16)$$

where
f: focal length of the overall optical system of the imaging lens,
f345: composite focal length of the third lens, the fourth lens, and the fifth lens, and f67: composite focal length of the sixth lens and the seventh lens.

The conditional expression (15) defines an appropriate range for the ratio of the composite focal length of the third, fourth, and fifth lenses to the focal length of the overall optical system of the imaging lens, and indicates a condition to achieve low-profileness and correct spherical aberrations and coma aberrations properly. If the value is above the upper limit of the conditional expression (15), the composite refractive power of the third, fourth, and fifth lenses would be too weak to shorten the total track length. On the other hand, if the value is below the lower limit of the conditional expression (15), the composite refractive power of the third, fourth, and fifth lenses would be too strong and spherical aberrations and coma aberrations would increase, thereby making it difficult to correct aberrations, though it would be advantageous in shortening the total track length.

The conditional expression (16) defines an appropriate range for the ratio of the composite focal length of the sixth and seventh lenses to the focal length of the overall optical system of the imaging lens, and indicates a condition to achieve low-profileness and correct chromatic aberrations properly. If the value is above the upper limit of the conditional expression (16), the composite negative refractive power of the sixth and seventh lenses would be too strong to shorten the total track length. On the other hand, if the value is below the lower limit of the conditional expression (16), the composite negative refractive power of the sixth and seventh lenses would be too weak to correct chromatic aberrations properly. When the conditional expressions (15) and (16) are satisfied, low-profileness is ensured and aberrations which occur on the third, fourth, and fifth lenses are corrected by the sixth and seventh lenses properly.

If the fifth lens has negative refractive power and the sixth lens has positive refractive power, preferably the imaging lens according to the present invention satisfies conditional expressions (17) and (18) below:

$$2.0 < f345/f < 8.0 \quad (17)$$

$$-6.0 < f67/f < -2.0 \quad (18)$$

where
f: focal length of the overall optical system of the imaging lens,
f345: composite focal length of the third lens, the fourth lens, and the fifth lens, and
f67: composite focal length of the sixth lens and the seventh lens.

The conditional expression (17) defines an appropriate range for the ratio of the composite focal length of the third, fourth, and fifth lenses to the focal length of the overall optical system of the imaging lens, and indicates a condition to achieve low-profileness and correct spherical aberrations and coma aberrations properly. If the value is above the upper limit of the conditional expression (17), the composite refractive power of the third, fourth, and fifth lenses would be too weak to shorten the total track length. On the other hand, if the value is below the lower limit of the conditional expression (17), the composite refractive power of the third, fourth, and fifth lenses would be too strong and spherical aberrations and coma aberrations would increase, thereby making it difficult to correct aberrations, though it would be advantageous in shortening the total track length.

The conditional expression (18) defines an appropriate range for the ratio of the composite focal length of the sixth and seventh lenses to the focal length of the overall optical system of the imaging lens, and indicates a condition to achieve low-profileness and correct chromatic aberrations properly. If the value is above the upper limit of the conditional expression (18), the composite negative refractive power of the sixth and seventh lenses would be too strong to shorten the total track length. On the other hand, if the value is below the lower limit of the conditional expression (18), the composite negative refractive power of the sixth and seventh lenses would be too weak to correct chromatic aberrations properly. When the conditional expressions (17) and (18) are satisfied, low-profileness is ensured and optical performance is improved.

Preferably, in the imaging lens according to present invention, the fifth lens has a meniscus shape with a concave surface on the object side. When the fifth lens has a meniscus shape with a concave surface on the object side, off-axial rays can exit the fifth lens at a small exit angle and easily enter the sixth lens, so that off-axial aberrations, mainly astigmatism and field curvature, are corrected properly.

If the fifth lens has positive refractive power, preferably the imaging lens according to the present invention satisfies a conditional expression (19) below:

$$0.8 < (r9+r10)/(r9-r10) < 2.5 \quad (19)$$

where
r9: curvature radius of the object-side surface of the fifth lens, and
r10: curvature radius of the image-side surface of the fifth lens.

The conditional expression (19) defines an appropriate range for the ratio of the sum of the curvature radii of the object-side and image-side surfaces of the fifth lens to the difference between the curvature radii, and indicates a condition to correct various aberrations properly, provided that the fifth lens has positive refractive power. If the value is above the upper limit of the conditional expression (19), the refractive power of the image-side surface of the fifth lens would be too weak to suppress high-order aberrations such as field curvature. On the other hand, if the value is below the lower limit of the conditional expression (19), the refractive power of the image-side surface of the fifth lens would be too strong to correct distortion in the peripheral area.

If the fifth lens has negative refractive power, preferably the imaging lens according to the present invention satisfies a conditional expression (20) below:

$$-20.0 < (r9+r10)/(r9-r10) < -4.0 \quad (20)$$

where
r9: curvature radius of the object-side surface of the fifth lens, and
r10: curvature radius of the image-side surface of the fifth lens.

The conditional expression (20) defines an appropriate range for the ratio of the sum of the curvature radii of the object-side and image-side surfaces of the fifth lens to the difference between the curvature radii, and indicates a condition to correct various aberrations properly, provided that the fifth lens has negative refractive power. If the value is above the upper limit of the conditional expression (20), the refractive power of the object-side surface of the fifth lens would be too strong to suppress astigmatism and distortion. On the other hand, if the value is below the lower limit of the conditional expression (20), the refractive power of the object-side surface of the fifth lens would be too weak to correct field curvature and coma aberrations. When the conditional expression (20) is satisfied, it is easier to correct coma aberrations, field curvature, astigmatism, and field curvature.

Preferably, the imaging lens according to the present invention satisfies a conditional expression (21) below:

$$f/EPD<2.40 \qquad (21)$$

where f: focal length of the overall optical system of the imaging lens, and

EPD: entrance pupil diameter.

The conditional expression (21) indicates a condition to determine the brightness of the imaging lens and corresponds to an F-value. When the pixel size is smaller, there is a tendency that the quantity of light which the image sensor takes from the imaging lens tends decreases and thus it is difficult to form a bright image. If the sensitivity of the image sensor is increased to address this problem, image quality may deteriorate due to noise, etc. Therefore, as a solution to the problem, it is effective to increase the quantity of light exiting the imaging lens. When the conditional expression (21) is satisfied, the imaging lens can be applied to a recent image sensor with a high pixel density.

Preferably, in the imaging lens according to the present invention, the first to seventh lenses are made of plastic material and all lens surfaces are aspheric. When plastic material is used for all the constituent lenses, the imaging lens with aspheric lens surfaces can be mass-produced stably at low cost. When all the lens surfaces are aspheric, various aberrations are corrected properly.

DETAILED DESCRIPTION OF THE PREFERRED EMBODIMENT

Hereinafter, the preferred embodiment of the present invention will be described in detail referring to the accompanying drawings. FIGS. 1, 3, 5, 7, 9, 11, 13, and 15 are schematic views showing the general configurations of the imaging lenses in Examples 1 to 8 according to this embodiment, respectively. Since all these examples have the same basic lens configuration, the general configuration of an imaging lens according to this embodiment is explained below mainly referring to the schematic view of Example 1.

Figure 1:
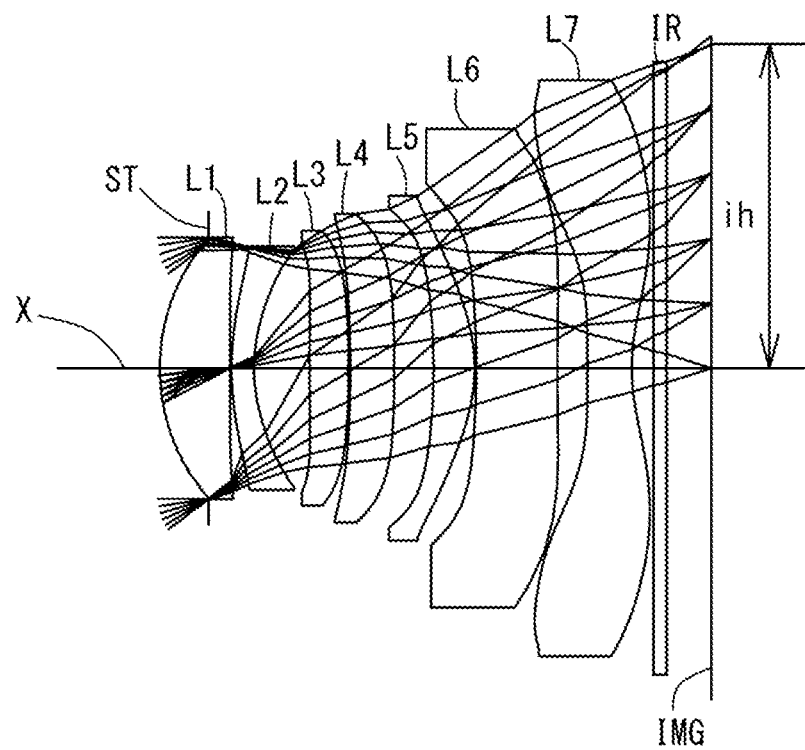
FIG. 1 is a schematic view showing the general configuration of an imaging lens in Example 1 according to an embodiment of the present invention.

As shown in FIG. 1, the imaging lens according to this embodiment is an imaging lens composed of seven constituent lenses which forms an image of an object on a solid-state image sensor and includes, in order from an object side to an image side, a first lens L1 with positive refractive power having a convex surface on the object side, a second lens L2 with negative refractive power, a third lens L3 with positive refractive power, a fourth lens L4 with negative refractive power, a fifth lens L5 with positive refractive power, a sixth lens L6 with negative refractive power, and a seventh lens L7 as a double-sided aspheric lens having a concave surface on the image side. These constituent lenses are spaced from each other and the third lens L3 to the sixth lens L6 each have at least one aspheric surface. The aspheric image-side surface of the seventh lens L7 has pole-change points off an optical axis X.

A filter IR such as an infrared cut filter is located between the seventh lens L7 and an image plane IMG. The filter IR is omissible. The values of total track length and back focus of the imaging lens according to this embodiment are defined to express distances on the optical axis X in which the filter IR is removed.

An aperture stop ST is located on the object side of the first lens L1.

In this embodiment, the first lens L1 is a biconvex lens having a convex surface on each of the object and image sides, which has strong positive refractive power to achieve low-profileness. As for the shape of the first lens L1, it only has to have a convex surface on the object side. It may have a meniscus shape with a convex surface on the object side as in Examples 3, 4, 5, 7, and 8 shown in FIGS. 5, 7, 9, 13, and 15, respectively.

The second lens L2 is a meniscus double-sided aspheric lens with negative refractive power having a convex surface on the object side, which properly corrects spherical aberrations and chromatic aberrations which occur on the first lens L1. The second lens L2 should at least have negative refractive power. It may have a biconcave shape with a concave surface on each of the object and image sides as in Example 4 shown in FIG. 7 or may have a meniscus shape with a concave surface on the object side as in Example 5 shown in FIG. 9.

The third lens L3 is a biconvex double-sided aspheric lens with positive refractive power having a convex surface on each of the object and images sides. The shape of the third lens L3 is not limited to a biconvex shape. Instead, it may be a meniscus shape with a concave surface on the object side as in Example 3 shown in FIG. 5 or a meniscus shape with a convex surface on the object side as in Example 5 shown in FIG. 9 or a biconcave shape with a concave surface on each of the object and image sides as in Example 8 shown in FIG. 15. The refractive power of the third lens L3 is not limited to positive refractive power. In Example 8 shown in FIG. 15, the third lens L3 has negative refractive power.

The fourth lens L4 is a meniscus double-sided aspheric lens with negative refractive power having a concave surface on the object side. The refractive power of the fourth lens L4 is not limited to negative refractive power. In Example 5 shown in FIG. 9, the fourth lens L4 is a meniscus lens with positive refractive power having a convex surface on the object side and in Example 8 shown in FIG. 15, the fourth lens L4 is a biconvex lens with positive refractive power having a convex surface on each of the object and image sides.

The fifth lens L5 is a meniscus double-sided aspheric lens with positive refractive power having a concave surface on the object side. The refractive power of the fifth lens L5 is not limited to positive refractive power. In Examples 7 and 8 shown in FIGS. 13 and 15, respectively, the fifth lens L5 is a meniscus lens with negative refractive power having a concave surface on the object side.

The sixth lens L6 is a biconcave double-sided aspheric lens with negative refractive power having a concave surface on each of the object and image sides. The refractive power of the sixth lens L6 is not limited to negative refractive power. In Examples 7 and 8 shown in FIGS. 13 and 15 respectively, the sixth lens L6 is a meniscus lens with positive refractive power having a convex surface on the object side.

The third lens L3 to the sixth lens L6 have appropriate positive or negative refractive power and their surfaces are aspheric, so that the imaging lens is low-profile and corrects off-axial aberrations such as astigmatism, field curvature, and distortion properly.

The seventh lens L7 is a biconcave double-sided aspheric lens with negative refractive power having a concave surface on each of the object and image sides. The both aspheric surfaces correct spherical aberrations, and field curvature and distortion in the peripheral area. Since the image-side surface of the seventh lens L7 is an aspheric surface with pole-change points, the angle of rays incident on the image sensor IMG is controlled appropriately. The shape of the seventh lens L7 is not limited to a biconcave shape. In Examples 3 and 7 shown in FIGS. 5 and 13 respectively, the seventh lens L7 has a meniscus shape with a convex surface on the object side.

In the imaging lens composed of seven constituent lenses according to this embodiment, when the first lens L1 and the second lens L2 are assumed to constitute one group, their composite refractive power is positive; when the third lens L3, the fourth lens L4, and the fifth lens L5 are assumed to constitute one group, their composite refractive power is positive; and when the sixth lens L6 and the seventh lens L7 are assumed to constitute one group, their composite refractive power is negative. Thus, positive, positive, and negative refractive power lens groups are arranged in order from the object side, making a so-called telephoto type power arrangement which is advantageous in making the imaging lens low-profile.

In the imaging lens according to this embodiment, the aperture stop ST is located on the object side of the first lens L1. Therefore, the exit pupil is remote from the image plane IMG, which ensures telecentricity and prevents a decline in the quantity of light in the peripheral area of the image.

When all the constituent lenses of the imaging lens according to this embodiment are made of plastic material, the manufacturing process is easier and the imaging lens can be mass-produced at low cost. All the lens surfaces have appropriate aspheric shapes to correct various aberrations more properly.

In the imaging lens according to this embodiment, if the fifth lens L5 has positive refractive power and the sixth lens L6 has negative refractive power, when conditional expressions (1) to (3), conditional expressions (6) to (10), conditional expressions (13) to (16), and conditional expressions (19) and (21) below are satisfied, advantageous effects are brought about. If the fifth lens L5 has negative refractive power and the sixth lens L6 has positive refractive power, when a conditional expression (1), conditional expressions (4) to (8), conditional expressions (11) to (14), and conditional expressions (17), (18), (20), and (21) below are satisfies, advantageous effects are brought about.

$$-1.0 < f1/f2 < -0.15 \quad (1)$$

$$0.5 < f5/f < 1.5 \quad (2)$$

$$-8.0 < f6/f < -1.0 \quad (3)$$

$$-20 < f5/f < -1.0 \quad (4)$$

$$1.0 < f6/f < 3.0 \quad (5)$$

$$20 < vd1-vd2 < 40 \quad (6)$$

$$40 < vd3 < 75 \quad (7)$$

$$40 < vd7 < 75 \quad (8)$$

$$40 < vd4 < 75 \quad (9)$$

$$20 < |vd5-vd6| < 40 \quad (10)$$

$$20 < |vd4-vd5| < 40 \quad (11)$$

$$40 < vd6 < 75 \quad (12)$$

$$1.0 < TTL/f < 1.35 \quad (13)$$

$$TTL/2ih < 1.0 \quad (14)$$

$$0.4 < f345/f < 1.2 \quad (15)$$

$$-1.0 < f67/f < -0.3 \quad (16)$$

$$2.0 < f345/f < 8.0 \quad (17)$$

$$-6.0 < f67/f < -2.0 \quad (18)$$

$$0.8 < (r9+r10)/(r9-r10) < 2.5 \quad (19)$$

$$-20.0 < (r9+r10)/(r9-r10) < -4.0 \quad (20)$$

$$f/EPD < 2.40 \quad (21)$$

where f: focal length of the overall optical system of the imaging lens, f1: focal length of the first lens L1,
f2: focal length of the second lens L2,
f5: focal length of the fifth lens L5,
f6: focal length of the sixth lens L6,
f345: composite focal length of the third lens L3, the fourth lens L4, and the fifth lens L5,
f67: composite focal length of the sixth lens L6 and the seventh lens L7,
vd1: Abbe number of the first lens L1 at d-ray,
vd2: Abbe number of the second lens L2 at d-ray,
vd3: Abbe number of the third lens L3 at d-ray,
vd4: Abbe number of the fourth lens L4 at d-ray,
vd5: Abbe number of the fifth lens L5 at d-ray,
vd6: Abbe number of the sixth lens L6 at d-ray,
vd7: Abbe number of the seventh lens L7 at d-ray,
r9: curvature radius of the object-side surface of the fifth lens L5,
r10: curvature radius of the image-side surface of the fifth lens L5,
TTL: distance on the optical axis X from the object-side surface of an optical element located nearest to the object to the image plane IMG with the filter IR removed (total track length),
ih: maximum image height, and
EPD: entrance pupil diameter.

In the imaging lens according to this embodiment, if the fifth lens L5 has positive refractive power and the sixth lens L6 has negative refractive power, when conditional expressions (1a) to (3a), conditional expressions (6a) to (10a), conditional expressions (13a) to (16a), and conditional expressions (19a) and (21a) below are satisfied, more advantageous effects are brought about. If the fifth lens L5 has negative refractive power and the sixth lens L6 has positive refractive power, when a conditional expression (1a), conditional expressions (4a) to (8a), conditional expressions (11a) to (14a), and conditional expressions (17a), (18a), (20a), and (21a) below are satisfied, more advantageous effects are brought about.

$$-0.80 < f1/f2 < -0.20 \tag{1a}$$

$$0.7 < f5/f < 1.3 \tag{2a}$$

$$-6.5 < f6/f < -2.0 \tag{3a}$$

$$-19 < f5/f < -2.0 \tag{4a}$$

$$1.4 < f6/f < 2.4 \tag{5a}$$

$$24 < vd1 - vd2 < 36 \tag{6a}$$

$$45 < vd3 < 65 \tag{7a}$$

$$45 < vd7 < 65 \tag{8a}$$

$$45 < vd4 < 65 \tag{9a}$$

$$24 < |vd5 - vd6| < 36 \tag{10a}$$

$$24 < |vd4 - vd5| < 36 \tag{11a}$$

$$45 < vd6 < 65 \tag{12a}$$

$$1.1 < TTL/f < 1.32 \tag{13a}$$

$$TTL/2ih < 0.95 \tag{14a}$$

$$0.6 < f345/f < 1.0 \tag{15a}$$

$$-0.8 < f67/f < -0.4 \tag{16a}$$

$$3.0 < f345/f < 7.0 \tag{17a}$$

$$-5.0 < f67/f < -2.5 \tag{18a}$$

$$0.9 < (r9+r10)/(r9-r10) < 2.3 \tag{19a}$$

$$-19.0 < (r9+r10)/(r9-r10) < -5.0 \tag{20a}$$

$$f/EPD < 2.20. \tag{21a}$$

The signs in the above conditional expressions have the same meanings as those in the preceding paragraph.

In the imaging lens according to this embodiment, if the fifth lens L5 has positive refractive power and the sixth lens L6 has negative refractive power, when conditional expressions (1b) to (3b), conditional expressions (6b) to (10b), conditional expressions (13b) to (16b), and conditional expressions (19b) and (21b) below are satisfied, particularly advantageous effects are brought about. If the fifth lens L5 has negative refractive power and the sixth lens L6 has positive refractive power, when a conditional expression (1b), conditional expressions (4b) to (8b), conditional expressions (11b) to (14b), and conditional expressions (17b), (18b), (20b), and (21b) below are satisfied, particularly advantageous effects are brought about.

$$-0.63 \leq f1/f2 \leq -0.31 \tag{1b}$$

$$0.92 \leq f5/f \leq 1.14 \tag{2b}$$

$$-5.07 \leq f6/f \leq -2.98 \tag{3b}$$

$$-17.70 \leq f5/f \leq -3.36 \tag{4b}$$

$$1.77 \leq f6/f1.84 \tag{5b}$$

$$28 < vd1 - vd2 < 34 \tag{6b}$$

$$50 < vd3 < 60 \tag{7b}$$

$$50 < vd7 < 60 \tag{8b}$$

$$50 < vd4 < 60 \tag{9b}$$

$$28 < |vd5 - vd6| < 32 \tag{10b}$$

$$28 < |vd4 - vd5| < 34 \tag{11b}$$

$$50 < vd6 < 60 \tag{12b}$$

$$1.23 \leq TTL/f \leq 1.28 \tag{13b}$$

$$TTL/2ih \leq 0.89 \tag{14b}$$

$$0.78 \leq f345/f \leq 0.88 \tag{15b}$$

$$-0.67 \leq f67/f \leq -0.59 \tag{16b}$$

$$4.11 \leq f345/f \leq 6.30 \tag{17b}$$

$$-4.00 \leq f67/f \leq -3.16 \tag{18b}$$

$$0.97 \leq (r9+r10)/(r9-r10) \leq 2.10 \tag{19b}$$

$$-17.23 \leq (r9+r10)/(r9-r10) \leq -6.98 \tag{20b}$$

$$f/EPD 2.08 \tag{21b}$$

The signs in the above conditional expressions have the same meanings as those in the paragraph before the preceding paragraph.

In this embodiment, all the lens surfaces are aspheric. The aspheric shapes of these lens surfaces are expressed by Equation 1, where Z denotes an axis in the optical axis direction, H denotes a height perpendicular to the optical axis, k denotes a conic constant, and A4, A6, A8, A10, A12, A14, and A16 denote aspheric surface coefficients.

$$Z = \frac{\frac{H^2}{R}}{1 + \sqrt{1-(k+1)\frac{H^2}{R^2}}} + A_4 H^4 + A_6 H^6 + A_8 H^8 + A_{10} H^{10} + A_{12} H^{12} + A_{14} H^{14} + A_{16} H^{16} \qquad \text{Equation 1}$$

Next, examples of the imaging lens according to this embodiment will be explained. In each example, f denotes the focal length of the overall optical system of the imaging lens, Fno denotes an F-number, ω denotes a half field of view, ih denotes a maximum image height, TTL denotes total track length. i denotes a surface number counted from the object side, r denotes a curvature radius, d denotes the distance on the optical axis X between lens surfaces (surface distance), Nd denotes a refractive index at d-ray (reference wavelength), and νd denotes an Abbe number at d-ray. As for aspheric surfaces, an asterisk (*) after surface number i indicates that the surface concerned is an aspheric surface.

Example 1

The basic lens data of Example 1 is shown below in Table 1.

TABLE 1

Example 1
in mm
f = 6.68
Fno = 1.64
ω(°) = 37.2
ih = 5.06
TTL = 8.52

Surface Data

| Surface No. i | Curvature Radius r | Surface Distance d | Refractive Index Nd | Abbe Number νd |
|---|---|---|---|---|
| (Object Surface | Infinity | Infinity | | |
| 1 (Stop) | Infinity | −0.760 | | |
| 2* | 3.162 | 1.092 | 1.5438 | 55.57 |
| 3* | −77.658 | 0.025 | | |
| 4* | 4.406 | 0.351 | 1.6391 | 23.25 |
| 5* | 2.552 | 0.864 | | |
| 6* | 34.655 | 0.609 | 1.5348 | 55.66 |
| 7* | −17.567 | 0.025 | | |
| 8* | −30.731 | 0.686 | 1.5348 | 55.66 |
| 9* | −38.000 | 0.614 | | |
| 10* | −11.066 | 0.642 | 1.5348 | 55.66 |
| 11* | −2.601 | 0.025 | | |
| 12* | −14.102 | 1.267 | 1.6142 | 25.58 |
| 13* | 99.000 | 0.469 | | |
| 14* | −99.000 | 0.687 | 1.5348 | 55.66 |
| 15* | 2.923 | 0.335 | | |
| 16 | Infinity | 0.210 | 1.5168 | 64.20 |
| 17 | Infinity | 0.695 | | |
| (Image Plane) | Infinity | | | |

Constituent Lens Data

| Lens | Start Surface | Focal Length |
|---|---|---|
| 1 | 2 | 5.61 (=f1) |
| 2 | 4 | −10.25 (=f2) |
| 3 | 6 | 21.89 (=f3) |
| 4 | 8 | −310.57 (=f4) |
| 5 | 10 | 6.20 (=f5) |
| 6 | 12 | −20.01 (=f6) |
| 7 | 14 | −5.30 (=f7) |

| Lens | Composite Focal Length |
|---|---|
| 3rd Lens-5th Lens | 5.19 (=f345) |
| 6th Lens-7th Lens | −3.94 (=f67) |

Aspheric Surface Data

| | 2nd Surface | 3rd Surface | 4th Surface | 5th Surface | 6th Surface | 7th Surface | 8th Surface |
|---|---|---|---|---|---|---|---|
| k | 0.000E+00 | 0.000E+00 | 0.000E+00 | 0.000E+00 | 0.000E+00 | 0.000E+00 | 0.000E+00 |
| A4 | 1.299E−03 | 4.550E−03 | −2.475E−02 | −3.225E−02 | −3.982E−03 | −3.145E−03 | −6.430E−03 |
| A6 | −5.531E−04 | 2.091E−03 | 1.157E−02 | 1.215E−02 | −2.194E−03 | −2.506E−03 | −3.547E−08 |
| A8 | 3.058E−04 | −7.995E−04 | −3.278E−03 | −3.337E−03 | 2.510E−04 | 1.678E−04 | 5.738E−05 |
| A10 | −3.081E−05 | 6.345E−05 | 3.003E−04 | 3.750E−04 | −6.792E−05 | −1.973E−05 | 0.000E+00 |
| A12 | 0.000E+00 | 0.000E+00 | 0.000E+00 | 0.000E+00 | 0.000E+00 | 0.000E+00 | 0.000E+00 |

TABLE 1-continued

Example 1
in mm
f = 6.68
Fno = 1.64
ω(°) = 37.2
ih = 5.06
TTL = 8.52

| | | | | | | | |
|---|---|---|---|---|---|---|---|
| A14 | 0.000E+00 | 0.000E+00 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 | 0.000E+00 | 0.000E+00 |

| | 9th Surface | 10th Surface | 11th Surface | 12th Surface | 13th Surface | 14th Surface | 15th Surface |
|---|---|---|---|---|---|---|---|
| k | 0.000E+00 | 0.000E+00 | −3.149E+00 | 0.000E+00 | 0.000E+00 | 0.000E+00 | −6.629E+00 |
| A4 | −8.923E−03 | −5.363E−03 | 8.674E−05 | 4.862E−03 | 5.257E−03 | −2.402E−02 | −1.964E−02 |
| A6 | −8.478E−04 | 2.890E−03 | 2.087E−03 | −6.707E−04 | −4.149E−03 | 9.619E−04 | 2.664E−03 |
| A8 | −4.465E−05 | −1.014E−03 | −5.790E−04 | −9.472E−04 | 8.861E−04 | 3.871E−04 | −2.455E−04 |
| A10 | 0.000E+00 | 6.498E−05 | 4.455E−05 | 3.047E−04 | −1.126E−04 | −5.234E−05 | 1.429E−05 |
| A12 | 0.000E+00 | 0.000E+00 | 0.000E+00 | −4.211E−05 | 8.775E−06 | 2.665E−06 | −4.629E−07 |
| A14 | 0.000E+00 | 0.000E+00 | 0.000E+00 | 2.145E−06 | −3.873E−07 | −5.661E−08 | 6.229E−09 |
| A16 | 0.000E+00 | 0.000E+00 | 0.000E+00 | 0.000E+00 | 7.362E−09 | 3.397E−10 | −2.369E−13 |

In the imaging lens in Example 1, the fifth lens L5 has positive refractive power and the sixth lens L6 has negative refractive power. As shown in Table 9, the imaging lens satisfies conditional expressions (1) to (3), conditional expressions (6) to (10), conditional expressions (13) to (16), and conditional expressions (19) and (21).

Figure 2:
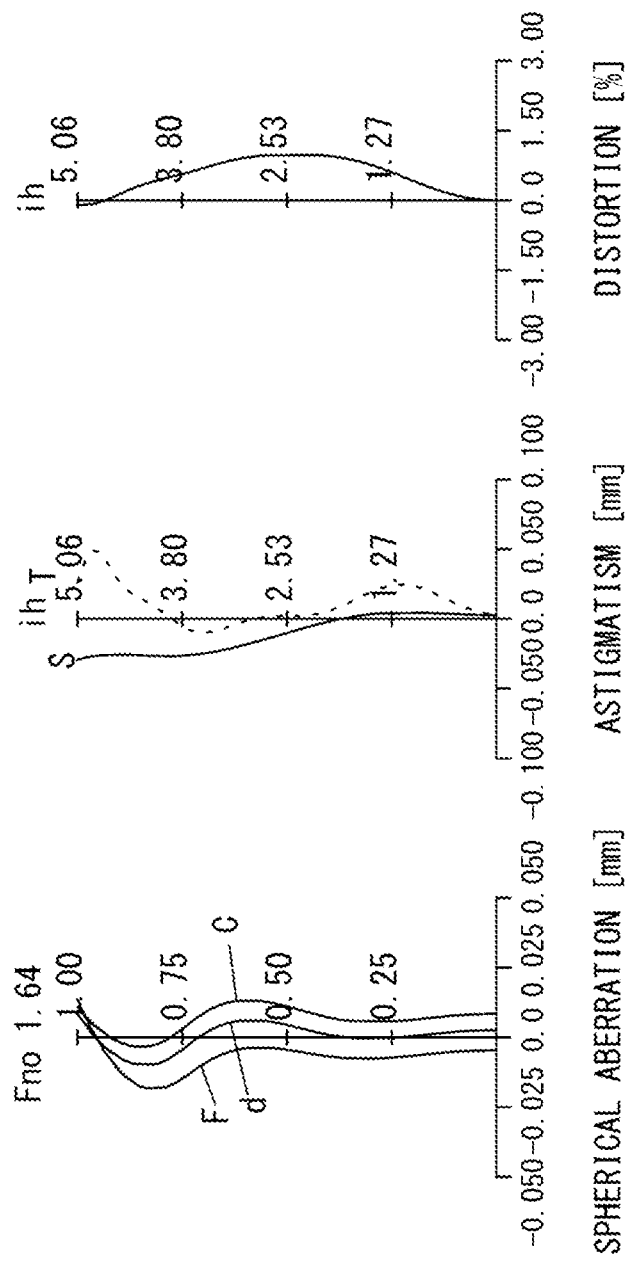
FIG. 2 shows spherical aberration, astigmatism, and distortion of the imaging lens in Example 1 according to the embodiment of the present invention.
Figure 3:
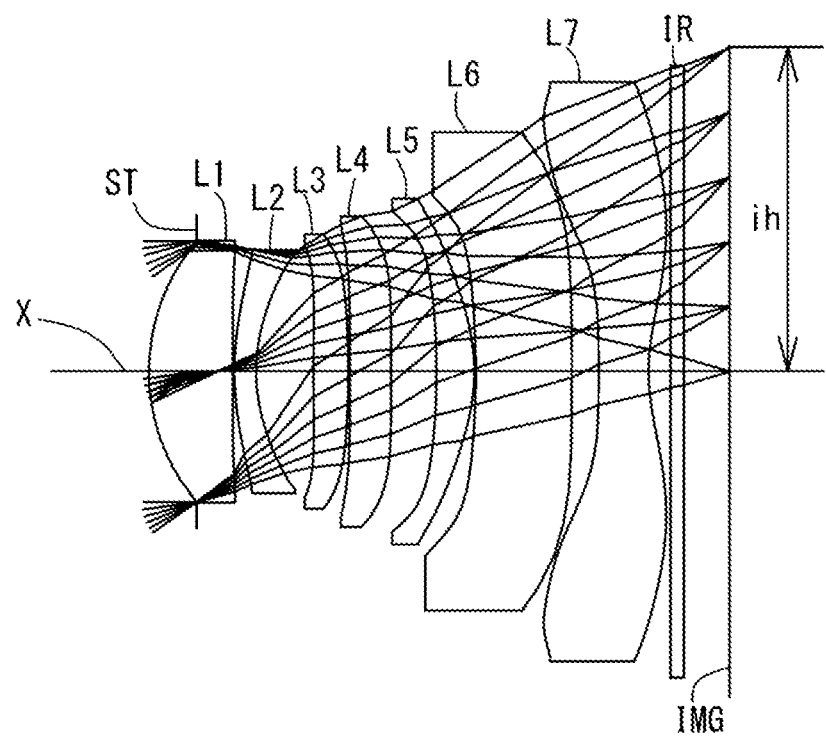
FIG. 3 is a schematic view showing the general configuration of an imaging lens in Example 2 according to the embodiment of the present invention.

FIG. 2 shows spherical aberration (mm), astigmatism (mm), and distortion (%) of the imaging lens in Example 1. The spherical aberration diagram shows the amount of aberration at wavelengths of F-ray (486 nm), d-ray (588 nm), and C-ray (656 nm). The astigmatism diagram shows the amount of aberration at d-ray on sagittal image surface S and the amount of aberration at d-ray on tangential image surface T (the same is true for FIGS. 4, 6, 8, 10, 12, 14, and 16). As shown in FIG. 2, each aberration is corrected properly.

Example 2

The basic lens data of Example 2 is shown below in Table 2.

TABLE 2

Example 2
in mm
f = 7.24
Fno = 1.78
ω(°) = 35.0
ih = 5.06
TTL = 8.98

Surface Data

| Surface No. i | Curvature Radius r | Surface Distance d | Refractive Index Nd | Abbe Number νd |
|---|---|---|---|---|
| (Object Surface) | Infinity | Infinity | | |
| 1 (Stop) | Infinity | −0.737 | | |
| 2* | 3.194 | 1.306 | 1.5438 | 55.57 |
| 3* | −99.000 | 0.025 | | |
| 4* | 4.434 | 0.336 | 1.6391 | 23.25 |
| 5* | 2.572 | 0.899 | | |
| 6* | 61.967 | 0.537 | 1.5348 | 55.66 |
| 7* | −18.462 | 0.025 | | |
| 8* | 99.000 | 0.643 | 1.5348 | 55.66 |
| 9* | 84.000 | 0.709 | | |
| 10* | −12.706 | 0.590 | 1.5348 | 55.66 |
| 11* | −3.032 | 0.025 | | |
| 12* | −11.488 | 1.497 | 1.6142 | 25.58 |
| 13* | −44.493 | 0.417 | | |
| 14* | −99.000 | 0.780 | 1.5348 | 55.66 |
| 15* | 3.131 | 0.340 | | |
| 16 | Infinity | 0.210 | 1.5168 | 64.20 |
| 17 | Infinity | 0.713 | | |
| (Image Plane) | Infinity | | | |

Constituent Lens Data

| Lens | Start Surface | Focal Length |
|---|---|---|
| 1 | 2 | 5.72 (=f1) |
| 2 | 4 | −10.31 (=f2) |

TABLE 2-continued

Example 2
in mm
f = 7.24
Fno = 1.78
ω(°) = 35.0
ih = 5.06
TTL = 8.98

| | | |
|---|---|---|
| 3 | 6 | 26.66 (=f3) |
| 4 | 8 | −1052.35 (=f4) |
| 5 | 10 | 7.29 (=f5) |
| 6 | 12 | −25.66 (=f6) |
| 7 | 14 | −5.66 (=f7) |

| Lens | Composite Focal Length |
|---|---|
| 3rd Lens-5th Lens | 6.07 (=f345) |
| 6th Lens-7th Lens | −4.33 (=f67) |

Aspheric Surface Data

| | 2nd Surface | 3rd Surface | 4th Surface | 5th Surface | 6th Surface | 7th Surface | 8th Surface |
|---|---|---|---|---|---|---|---|
| k | 0.000E+00 | 0.000E+00 | 0.000E+00 | 0.000E+00 | 0.000E+00 | 0.000E+00 | 0.000E+00 |
| A4 | 1.211E−03 | 4.682E−03 | −2.511E−02 | −3.283E−02 | −3.311E−03 | −2.853E−03 | −6.946E−03 |
| A6 | −6.238E−04 | 1.880E−03 | 1.163E−02 | 1.227E−02 | −2.017E−03 | −2.357E−03 | −9.364E−05 |
| A8 | 2.808E−04 | −8.340E−04 | −3.260E−03 | −3.279E−03 | 2.197E−04 | 1.569E−04 | 5.120E−05 |
| A10 | −3.399E−05 | 6.919E−05 | 3.051E−04 | 3.588E−04 | −6.487E−05 | −2.318E−05 | 0.000E+00 |
| A12 | 0.000E+00 | 0.000E+00 | 0.000E+00 | 0.000E+00 | 0.000E+00 | 0.000E+00 | 0.000E+00 |
| A14 | 0.000E+00 | 0.000E+00 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 | 0.000E+00 | 0.000E+00 |

| | 9th Surface | 10th Surface | 11th Surface | 12th Surface | 13th Surface | 14th Surface | 15th Surface |
|---|---|---|---|---|---|---|---|
| k | 0.000E+00 | 0.000E+00 | −3.100E+00 | 0.000E+00 | 0.000E+00 | 0.000E+00 | −6.544E+00 |
| A4 | −9.118E−03 | −6.338E−03 | 1.866E−03 | 6.205E−03 | 6.366E−03 | −2.394E−02 | −1.926E−02 |
| A6 | −6.852E−04 | 3.004E−03 | 1.891E−03 | −5.199E−04 | −4.132E−03 | 9.367E−04 | 2.621E−03 |
| A8 | −4.378E−05 | −9.952E−04 | −6.108E−04 | −9.594E−04 | 8.854E−04 | 3.871E−04 | −2.440E−04 |
| A10 | 0.000E+00 | 6.164E−05 | 4.524E−05 | 3.024E−04 | −1.129E−04 | −5.232E−05 | 1.436E−05 |
| A12 | 0.000E+00 | 0.000E+00 | 0.000E+00 | −4.213E−05 | 8.766E−06 | 2.667E−06 | −4.627E−07 |
| A14 | 0.000E+00 | 0.000E+00 | 0.000E+00 | 2.160E−06 | −3.874E−07 | −5.647E−08 | 6.113E−09 |
| A16 | 0.000E+00 | 0.000E+00 | 0.000E+00 | 0.000E+00 | 7.450E−09 | 3.325E−10 | 0.000E+00 |

In the imaging lens in Example 2, the fifth lens L5 has positive refractive power and the sixth lens L6 has negative refractive power. As shown in Table 9, the imaging lens satisfies conditional expressions (1) to (3), conditional expressions (6) to (10), conditional expressions (13) to (16), and conditional expressions (19) and (21).

Figure 4:
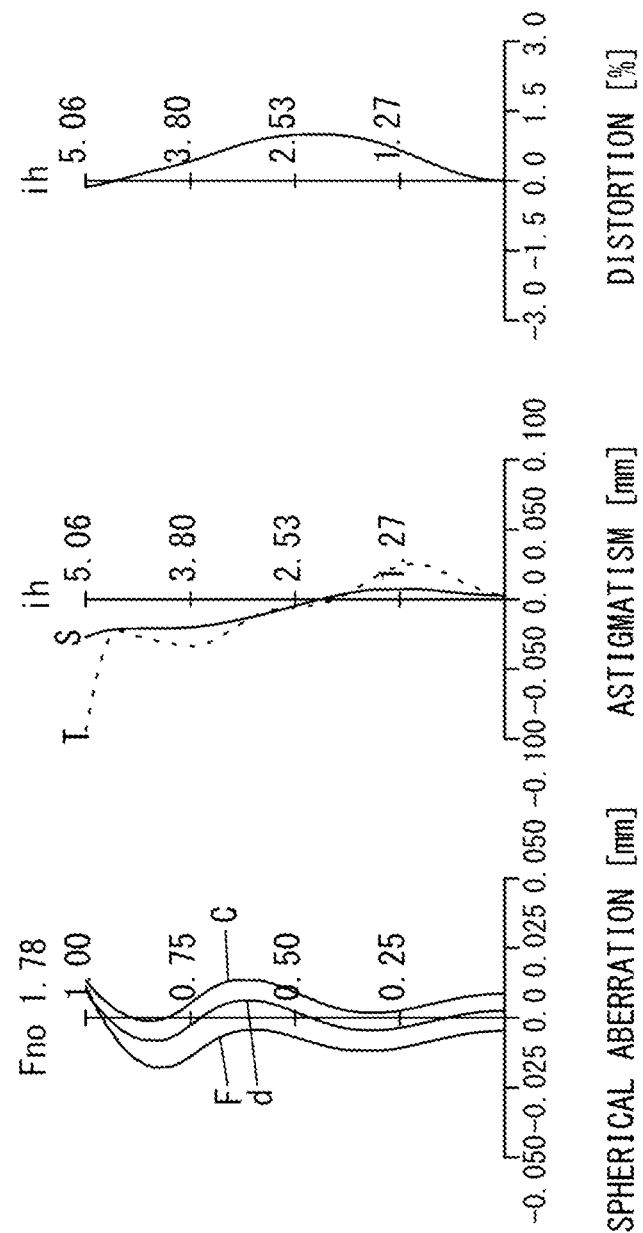
FIG. 4 shows spherical aberration, astigmatism, and distortion of the imaging lens in Example 2 according to the embodiment of the present invention.
Figure 5:
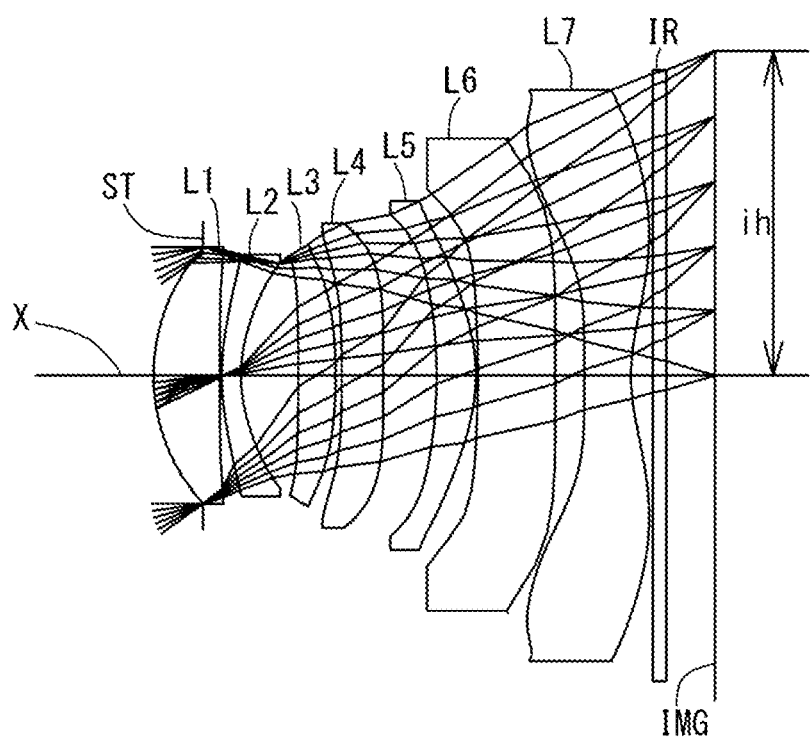
FIG. 5 is a schematic view showing the general configuration of an imaging lens in Example 3 according to the embodiment of the present invention.

FIG. 4 shows spherical aberration (mm), astigmatism (mm), and distortion (%) of the imaging lens in Example 2. As shown in FIG. 4, each aberration is corrected properly.

Example 3

The basic lens data of Example 3 is shown below in Table 3.

TABLE 3

Example 3
in mm
f = 7.04
Fno = 1.73
ω(°) = 35.5
ih = 5.06
TTL = 8.69

Surface Data

| Surface No. i | Curvature Radius r | Surface Distance d | Refractive Index Nd | Abbe Number vd |
|---|---|---|---|---|
| (Object Surface) | Infinity | Infinity | | |
| 1 (Stop) | Infinity | −0.771 | | |
| 2* | 3.054 | 1.031 | 1.5438 | 55.57 |
| 3* | 100.000 | 0.030 | | |
| 4* | 3.512 | 0.300 | 1.6349 | 23.97 |
| 5* | 2.224 | 0.893 | | |
| 6* | −100.000 | 0.584 | 1.5348 | 55.66 |
| 7* | −8.285 | 0.093 | | |
| 8* | −100.000 | 0.649 | 1.5348 | 55.66 |
| 9* | 100.000 | 0.832 | | |

TABLE 3-continued

Example 3
in mm
f = 7.04
Fno = 1.73
ω(°) = 35.5
ih = 5.06
TTL = 8.69

| | | | | |
|---|---|---|---|---|
| 10* | −8.231 | 0.611 | 1.5438 | 55.57 |
| 11* | −2.927 | 0.033 | | |
| 12* | −17.671 | 1.206 | 1.6142 | 25.58 |
| 13* | −100.000 | 0.454 | | |
| 14* | 100.000 | 0.728 | 1.5348 | 55.66 |
| 15* | 2.976 | 0.340 | | |
| 16 | Infinity | 0.210 | 1.5168 | 64.20 |
| 17 | Infinity | 0.763 | | |
| (Image Plane) | Infinity | | | |

Constituent Lens Data

| Lens | Start Surface | Focal Length |
|---|---|---|
| 1 | 2 | 5.77 (=f1) |
| 2 | 4 | −10.50 (=f2) |
| 3 | 6 | 16.85 (=f3) |
| 4 | 8 | −93.39 (=f4) |
| 5 | 10 | 8.03 (=f5) |
| 6 | 12 | −35.14 (=f6) |
| 7 | 14 | −5.75 (=f7) |

| Lens | Composite Focal Length |
|---|---|
| 3rd Lens-5th Lens | 6.19 (=f345) |
| 6th Lens-7th Lens | −4.73 (=f67) |

Aspheric Surface Data

| | 2nd Surface | 3rd Surface | 4th Surface | 5th Surface | 6th Surface | 7th Surface | 8th Surface |
|---|---|---|---|---|---|---|---|
| k | 0.000E+00 | 0.000E+00 | 0.000E+00 | 0.000E+00 | 0.000E+00 | 0.000E+00 | 0.000E+00 |
| A4 | 2.495E−03 | 1.139E−03 | −4.195E−02 | −4.764E−02 | −2.266E−03 | −1.210E−02 | −2.148E−02 |
| A6 | −4.970E−04 | 1.167E−03 | 1.265E−02 | 1.290E−02 | −2.394E−03 | −1.613E−04 | 9.998E−04 |
| A8 | 1.320E−04 | −2.268E−04 | −2.260E−03 | −2.370E−03 | 1.543E−04 | −1.069E−04 | 2.304E−04 |
| A10 | −2.029E−06 | 9.859E−06 | 1.550E−04 | 1.394E−04 | −7.792E−06 | 6.624E−05 | 0.000E+00 |
| A12 | 0.000E+00 | 0.000E+00 | 0.000E+00 | 8.605E−06 | 0.000E+00 | 0.000E+00 | 0.000E+00 |
| A14 | 0.000E+00 | 0.000E+00 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 | 0.000E+00 | 0.000E+00 |

| | 9th Surface | 10th Surface | 11th Surface | 12th Surface | 13th Surface | 14th Surface | 15th Surface |
|---|---|---|---|---|---|---|---|
| k | 0.000E+00 | 0.000E+00 | −1.967E+00 | 0.000E+00 | 0.000E+00 | 0.000E+00 | −6.154E+00 |
| A4 | −1.522E−02 | −6.239E−03 | 4.188E−03 | 3.461E−03 | 6.455E−03 | −2.567E−02 | −1.942E−02 |
| A6 | −3.727E−04 | 3.258E−03 | 1.782E−03 | 7.290E−05 | −4.205E−03 | 9.424E−04 | 2.521E−03 |
| A8 | −8.733E−05 | −9.653E−04 | −5.684E−04 | −1.059E−03 | 8.860E−04 | 3.860E−04 | −2.351E−04 |
| A10 | 0.000E+00 | 6.283E−05 | 4.266E−05 | 3.034E−04 | −1.140E−04 | −5.207E−05 | 1.410E−05 |
| A12 | 0.000E+00 | 0.000E+00 | 0.000E+00 | −4.064E−05 | 8.812E−06 | 2.691E−06 | −4.650E−07 |
| A14 | 0.000E+00 | 0.000E+00 | 0.000E+00 | 2.044E−06 | −3.821E−07 | −5.753E−08 | 6.292E−09 |
| A16 | 0.000E+00 | 0.000E+00 | 0.000E+00 | 0.000E+00 | 7.291E−09 | 3.131E−10 | 0.000E+00 |

In the imaging lens in Example 3, the fifth lens L5 has positive refractive power and the sixth lens L6 has negative refractive power. As shown in Table 9, the imaging lens satisfies conditional expressions (1) to (3), conditional expressions (6) to (10), conditional expressions (13) to (16), and conditional expressions (19) and (21).

Figure 6:
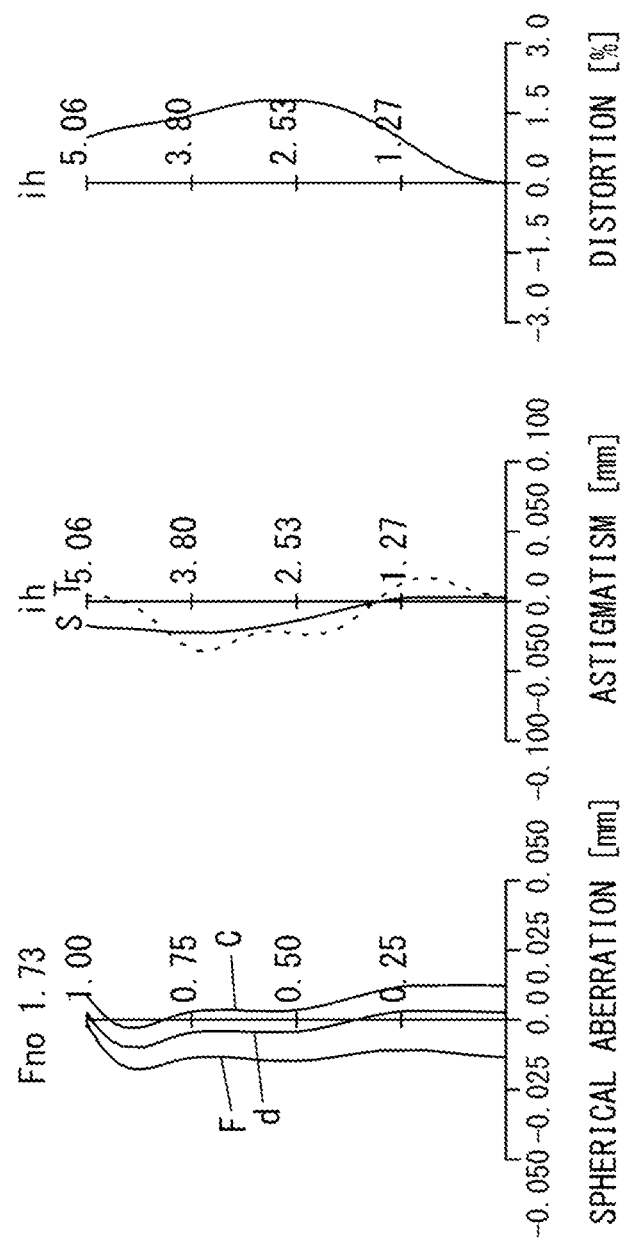
FIG. 6 shows spherical aberration, astigmatism, and distortion of the imaging lens in Example 3 according to the embodiment of the present invention.
Figure 7:
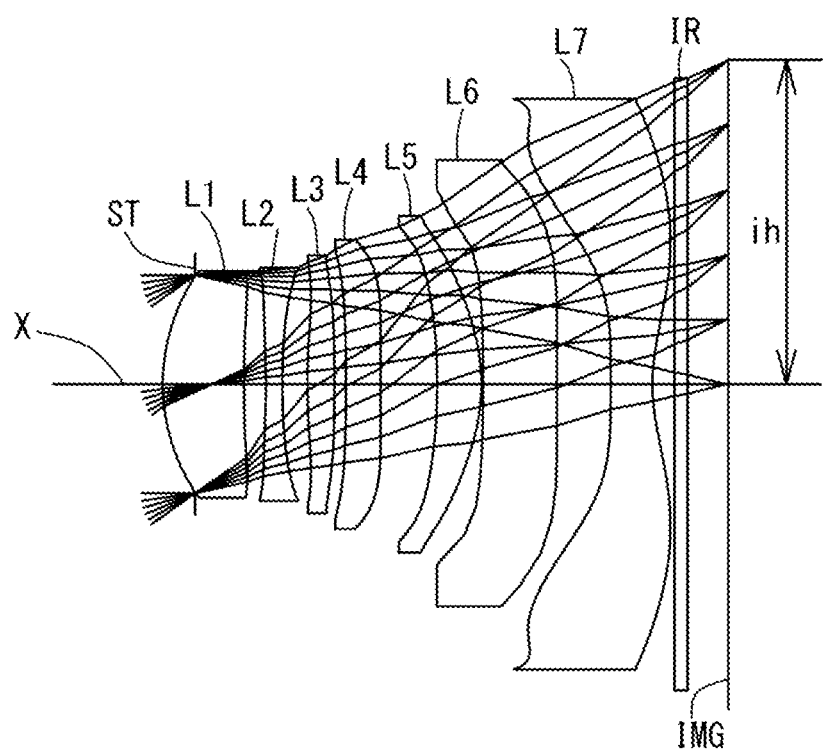
FIG. 7 is a schematic view showing the general configuration of an imaging lens in Example 4 according to the embodiment of the present invention.

FIG. 6 shows spherical aberration (mm), astigmatism (mm), and distortion (%) of the imaging lens in Example 3. As shown in FIG. 6, each aberration is corrected properly.

Example 4

The basic lens data of Example 4 is shown below in Table 4.

TABLE 4

Example 4
in mm
f = 7.07
Fno = 2.08
ω(°) = 35.5
ih = 5.06
TTL = 8.74

Surface Data

| Surface No. i | Curvature Radius r | Surface Distance d | Refractive Index Nd | Abbe Number νd |
|---|---|---|---|---|
| (Object Surface) | Infinity | Infinity | | |
| 1 (Stop) | Infinity | −0.503 | | |
| 2* | 3.073 | 1.267 | 1.5438 | 55.57 |
| 3* | 22.871 | 0.340 | | |
| 4* | −10.326 | 0.260 | 1.6391 | 23.25 |
| 5* | 17.895 | 0.386 | | |
| 6* | 9.119 | 0.424 | 1.5348 | 55.66 |
| 7* | −31.044 | 0.175 | | |
| 8* | −236.297 | 0.545 | 1.5348 | 55.66 |
| 9* | 35.694 | 0.883 | | |
| 10* | −9.388 | 0.688 | 1.5438 | 55.57 |
| 11* | −2.967 | 0.030 | | |
| 12* | −20.276 | 1.150 | 1.6142 | 25.58 |
| 13* | −264.821 | 0.836 | | |
| 14* | −119.618 | 0.651 | 1.5348 | 55.66 |
| 15* | 3.022 | 0.340 | | |
| 16 | Infinity | 0.210 | 1.5168 | 64.20 |
| 17 | Infinity | 0.631 | | |
| (Image Plane) | Infinity | | | |

Constituent Lens Data

| Lens | Start Surface | Focal Length |
|---|---|---|
| 1 | 2 | 6.38 (=f1) |
| 2 | 4 | −10.21 (=f2) |
| 3 | 6 | 13.23 (=f3) |
| 4 | 8 | −57.94 (=f4) |
| 5 | 10 | 7.69 (=f5) |
| 6 | 12 | −35.81 (=f6) |
| 7 | 14 | −5.50 (=f7) |

| Lens | Composite Focal Length |
|---|---|
| 3rd Lens-5th Lens | 5.86 (=f345) |
| 6th Lens-7th Lens | −4.55 (=f67) |

Aspheric Surface Data

| | 2nd Surface | 3rd Surface | 4th Surface | 5th Surface | 6th Surface | 7th Surface | 8th Surface |
|---|---|---|---|---|---|---|---|
| k | 0.000E+00 | 0.000E+00 | 0.000E+00 | 0.000E+00 | 0.000E+00 | 0.000E+00 | 0.000E+00 |
| A4 | 2.812E−04 | 4.073E−03 | 3.229E−02 | 2.923E−02 | −8.377E−03 | −2.600E−03 | −8.781E−03 |
| A6 | −1.297E−05 | −5.890E−04 | −1.288E−02 | −1.199E−02 | −3.358E−03 | −2.397E−03 | −1.457E−04 |
| A8 | 1.450E−04 | −5.893E−04 | 2.540E−03 | 3.062E−03 | 2.511E−04 | 1.666E−04 | 7.783E−05 |
| A10 | −5.933E−05 | −4.393E−05 | −3.411E−04 | −2.729E−04 | 5.484E−05 | 9.113E−05 | 0.000E+00 |
| A12 | 0.000E+00 | 0.000E+00 | 0.000E+00 | 0.000E+00 | 0.000E+00 | 0.000E+00 | 0.000E+00 |
| A14 | 0.000E+00 | 0.000E+00 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 | 0.000E+00 | 0.000E+00 |

| | 9th Surface | 10th Surface | 11th Surface | 12th Surface | 13th Surface | 14th Surface | 15th Surface |
|---|---|---|---|---|---|---|---|
| k | 0.000E+00 | 0.000E+00 | −2.471E+00 | 0.000E+00 | 0.000E+00 | 0.000E+00 | −6.051E+00 |
| A4 | −1.142E−02 | −5.936E−03 | 1.218E−03 | 4.643E−03 | 4.069E−03 | −2.814E−02 | −1.968E−02 |
| A6 | −3.945E−04 | 3.391E−03 | 1.616E−03 | −6.900E−04 | −4.052E−03 | 8.469E−04 | 2.597E−03 |
| A8 | −1.944E−04 | −9.977E−04 | −6.517E−04 | −9.624E−04 | 8.739E−04 | 3.958E−04 | −2.406E−04 |
| A10 | 0.000E+00 | 6.473E−05 | 5.661E−05 | 3.045E−04 | −1.136E−04 | −5.176E−05 | 1.426E−05 |

TABLE 4-continued

Example 4
in mm
f = 7.07
Fno = 2.08
ω(°) = 35.5
ih = 5.06
TTL = 8.74

| | | | | | | |
|---|---|---|---|---|---|---|
| A12 | 0.000E+00 | 0.000E+00 | 0.000E+00 | −4.164E−05 | 8.695E−06 | 2.678E−06 | −4.678E−07 |
| A14 | 0.000E+00 | 0.000E+00 | 0.000E+00 | 2.097E−06 | −3.760E−07 | −5.547E−08 | 6.364E−09 |
| A16 | 0.000E+00 | 0.000E+00 | 0.000E+00 | 0.000E+00 | 7.528E−09 | 1.932E−10 | 0.000E+00 |

In the imaging lens in Example 4, the fifth lens L5 has positive refractive power and the sixth lens L6 has negative refractive power. As shown in Table 9, the imaging lens satisfies conditional expressions (1) to (3), conditional expressions (6) to (10), conditional expressions (13) to (16), and conditional expressions (19) and (21).

Figure 8:
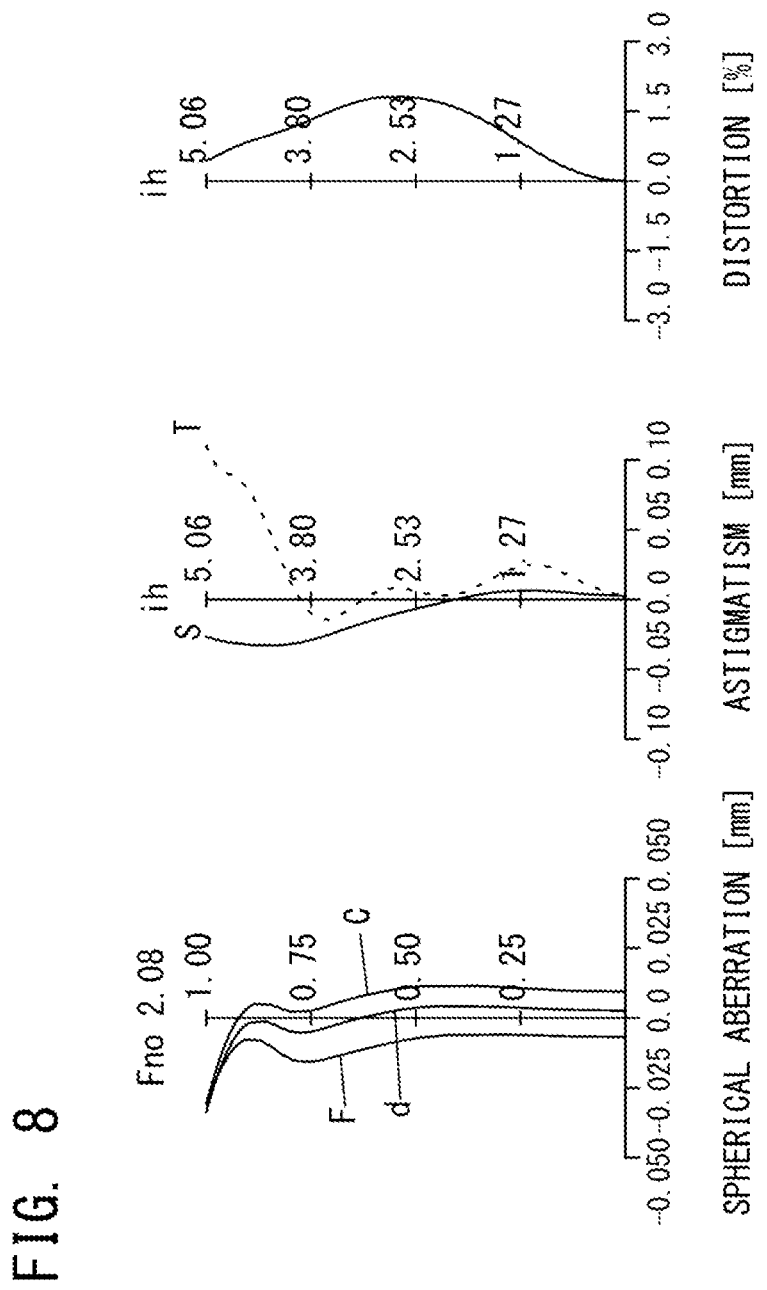
FIG. 8 shows spherical aberration, astigmatism, and distortion of the imaging lens in Example 4 according to the embodiment of the present invention.
Figure 9:
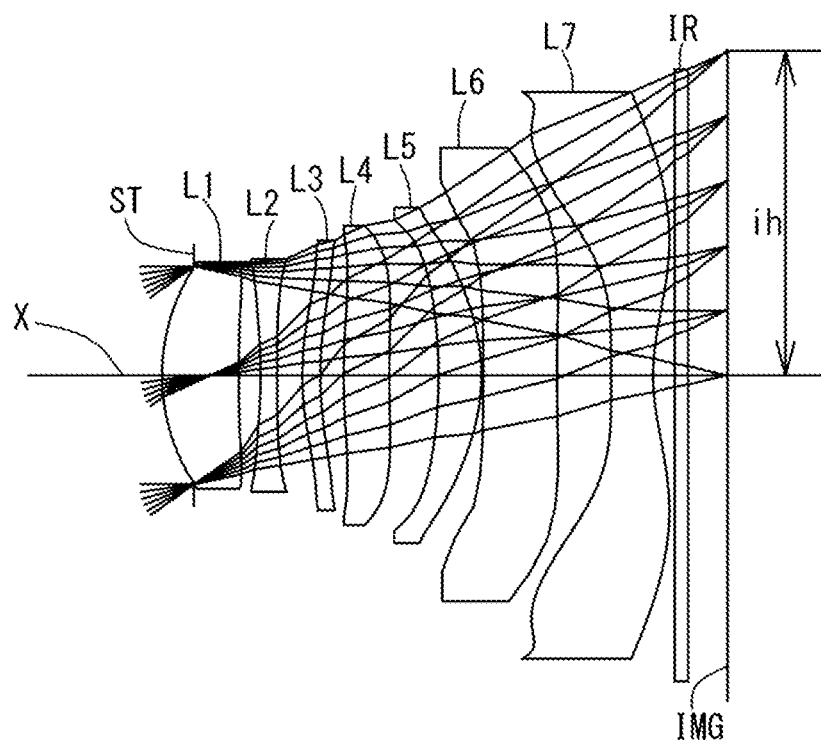
FIG. 9 is a schematic view showing the general configuration of an imaging lens in Example 5 according to the embodiment of the present invention.

FIG. 8 shows spherical aberration (mm), astigmatism (mm), and distortion (%) of the imaging lens in Example 4. As shown in FIG. 8, each aberration is corrected properly.

Example 5

The basic lens data of Example 5 is shown below in Table 5.

TABLE 5

Example 5
in mm
f = 7.07
Fno = 2.08
ω(°) = 35.5
ih = 5.06
TTL = 8.74

Surface Data

| Surface No. i | Curvature Radius r | Surface Distance d | Refractive Index Nd | Abbe Number νd |
|---|---|---|---|---|
| (Object Surface) | Infinity | Infinity | | |
| 1 (Stop) | Infinity | −0.763 | | |
| 2* | 3.124 | 1.196 | 1.5438 | 55.57 |
| 3* | 22.290 | 0.342 | | |
| 4* | −6.797 | 0.260 | 1.6391 | 23.25 |
| 5* | −100.000 | 0.389 | | |
| 6* | 4.544 | 0.282 | 1.5348 | 55.66 |
| 7* | 5.738 | 0.361 | | |
| 8* | 9.604 | 0.713 | 1.5348 | 55.66 |
| 9* | 21.488 | 0.766 | | |
| 10* | −8.892 | 0.672 | 1.5438 | 55.57 |
| 11* | −3.007 | 0.030 | | |
| 12* | −31.825 | 1.150 | 1.6142 | 25.58 |
| 13* | 39.416 | 0.843 | | |
| 14* | −100.000 | 0.651 | 1.5348 | 55.66 |
| 15* | 3.196 | 0.340 | | |
| 16 | Infinity | 0.210 | 1.5168 | 64.20 |
| 17 | Infinity | 0.608 | | |
| (Image Plane) | Infinity | | | |

Constituent Lens Data

| Lens | Start Surface | Focal Length |
|---|---|---|
| 1 | 2 | 6.54 (=f1) |
| 2 | 4 | −11.42 (=f2) |
| 3 | 6 | 37.72 (=f3) |
| 4 | 8 | 31.81 (=f4) |
| 5 | 10 | 8.03 (=f5) |
| 6 | 12 | −28.49 (=f6) |
| 7 | 14 | −5.78 (=f7) |

| Lens | Composite Focal Length |
|---|---|
| 3rd Lens-5th Lens | 6.12 (=f345) |
| 6th Lens-7th Lens | −4.58 (=f67) |

TABLE 5-continued

Example 5
in mm
f = 7.07
Fno = 2.08
ω(°) = 35.5
ih = 5.06
TTL = 8.74

Aspheric Surface Data

|     | 2nd Surface | 3rd Surface | 4th Surface | 5th Surface | 6th Surface | 7th Surface | 8th Surface |
| --- | --- | --- | --- | --- | --- | --- | --- |
| k   | 0.000E+00 | 0.000E+00 | 0.000E+00 | 0.000E+00 | 0.000E+00 | 0.000E+00 | 0.000E+00 |
| A4  | 6.774E−04 | 2.353E−03 | 3.310E−02 | 2.990E−02 | −7.780E−03 | −4.218E−03 | −1.063E−02 |
| A6  | −2.737E−04 | −6.591E−04 | −1.296E−02 | −1.204E−02 | −3.417E−03 | −3.030E−03 | −2.298E−04 |
| A8  | 2.628E−04 | −4.045E−04 | 2.525E−03 | 2.946E−03 | 1.118E−04 | 1.352E−04 | 4.425E−05 |
| A10 | −7.102E−05 | −5.296E−05 | −2.680E−04 | −2.065E−04 | 7.835E−05 | 7.224E−05 | 0.000E+00 |
| A12 | 0.000E+00 | 0.000E+00 | 0.000E+00 | 0.000E+00 | 0.000E+00 | 0.000E+00 | 0.000E+00 |
| A14 | 0.000E+00 | 0.000E+00 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 | 0.000E+00 | 0.000E+00 |

|     | 9th Surface | 10th Surface | 11th Surface | 12th Surface | 13th Surface | 14th Surface | 15th Surface |
| --- | --- | --- | --- | --- | --- | --- | --- |
| k   | 0.000E+00 | 0.000E+00 | −2.027E+00 | 0.000E+00 | 0.000E+00 | 0.000E+00 | −6.107E+00 |
| A4  | −1.090E−02 | −7.975E−03 | 6.022E−04 | 1.995E−03 | 2.804E−03 | −2.777E−02 | −2.042E−02 |
| A6  | −3.063E−04 | 3.573E−03 | 1.601E−03 | −5.653E−04 | −4.002E−03 | 8.375E−04 | 2.641E−03 |
| A8  | −1.676E−04 | −1.026E−03 | −6.439E−04 | −9.592E−04 | 8.779E−04 | 3.958E−04 | −2.410E−04 |
| A10 | 0.000E+00 | 5.987E−05 | 5.865E−05 | 3.050E−04 | −1.135E−04 | −5.174E−05 | 1.421E−05 |
| A12 | 0.000E+00 | 0.000E+00 | 0.000E+00 | −4.153E−05 | 8.707E−06 | 2.678E−06 | −4.664E−07 |
| A14 | 0.000E+00 | 0.000E+00 | 0.000E+00 | 2.095E−06 | −3.764E−07 | −5.554E−08 | 6.392E−09 |
| A16 | 0.000E+00 | 0.000E+00 | 0.000E+00 | 0.000E+00 | 7.374E+09 | 1.926E+10 | 0.000E+00 |

In the imaging lens in Example 5, the fifth lens L5 has positive refractive power and the sixth lens L6 has negative refractive power. As shown in Table 9, the imaging lens satisfies conditional expressions (1) to (3), conditional expressions (6) to (10), conditional expressions (13) to (16), and conditional expressions (19) and (21).

Figure 10:
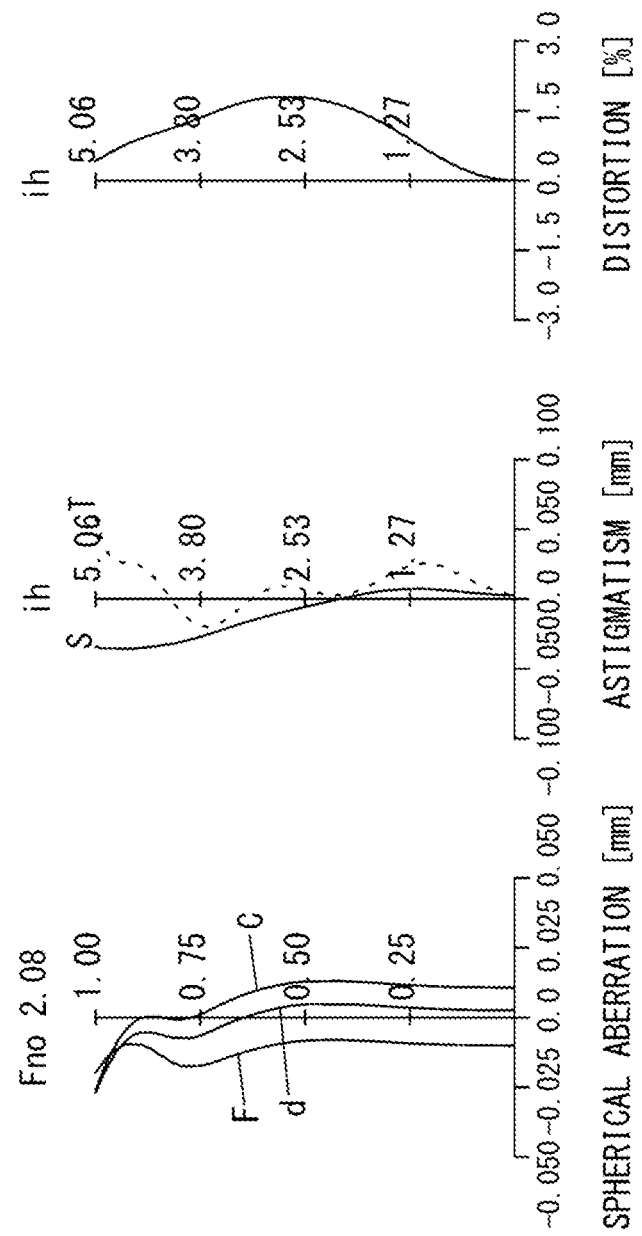
FIG. 10 shows spherical aberration, astigmatism, and distortion of the imaging lens in Example 5 according to the embodiment of the present invention.
Figure 11:
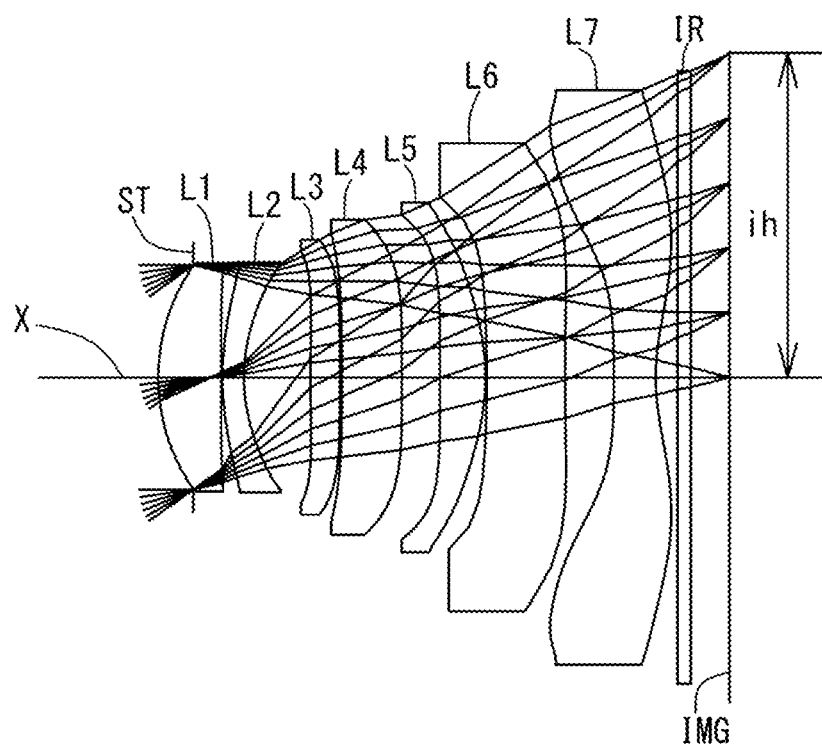
FIG. 11 is a schematic view showing the general configuration of an imaging lens in Example 6 according to the embodiment of the present invention.

FIG. 10 shows spherical aberration (mm), astigmatism (mm), and distortion (%) of the imaging lens in Example 5. As shown in FIG. 10, each aberration is corrected properly.

Example 6

The basic lens data of Example 6 is shown below in Table 6.

TABLE 6

Example 6
in mm
f = 7.05
Fno = 2.01
ω(°) = 35.5
ih = 5.06
TTL = 8.83

Surface Data

| Surface No. i | Curvature Radius r | Surface Distance d | Refractive Index Nd | Abbe Number νd |
| --- | --- | --- | --- | --- |
| (Object Surface) | Infinity | Infinity | | |
| 1 (Stop) | Infinity | −0.543 | | |
| 2* | 3.137 | 0.974 | 1.5438 | 55.57 |
| 3* | −304.981 | 0.025 | | |
| 4* | 4.311 | 0.333 | 1.6391 | 23.25 |
| 5* | 2.561 | 1.037 | | |
| 6* | 32.141 | 0.464 | 1.5348 | 55.66 |
| 7* | −56.524 | 0.025 | | |
| 8* | −312.099 | 0.938 | 1.5348 | 55.66 |
| 9* | 134.541 | 0.595 | | |
| 10* | 200.000 | 0.708 | 1.5348 | 55.66 |
| 11* | −3.532 | 0.025 | | |
| 12* | −16.516 | 1.218 | 1.6142 | 25.58 |
| 13* | 60.969 | 0.761 | | |
| 14* | −36.624 | 0.651 | 1.5348 | 55.66 |
| 15* | 3.386 | 0.340 | | |
| 16 | Infinity | 0.210 | 1.5168 | 64.20 |
| 17 | Infinity | 0.601 | | |
| (Image Plane) | Infinity | | | |

TABLE 6-continued

Example 6
in mm
f = 7.05
Fno = 2.01
ω(°) = 35.5
ih = 5.06
TTL = 8.83

Constituent Lens Data

| Lens | Start Surface | Focal Length |
|---|---|---|
| 1 | 2 | 5.72 (=f1) |
| 2 | 4 | −10.66 (=f2) |
| 3 | 6 | 38.38 (=f3) |
| 4 | 8 | −175.66 (=f4) |
| 5 | 10 | 6.50 (=f5) |
| 6 | 12 | −21.03 (=f6) |
| 7 | 14 | −5.76 (=f7) |

| Lens | Composite Focal Length |
|---|---|
| 3rd Lens-5th Lens | 5.96 (=f345) |
| 6th Lens-7th Lens | −4.25 (=f67) |

Aspheric Surface Data

|  | 2nd Surface | 3rd Surface | 4th Surface | 5th Surface | 6th Surface | 7th Surface | 8th Surface |
|---|---|---|---|---|---|---|---|
| k | 0.000E+00 | 0.000E+00 | 0.000E+00 | 0.000E+00 | 0.000E+00 | 0.000E+00 | 0.000E+00 |
| A4 | 1.961E−03 | 4.675E−03 | −2.514E−02 | −3.275E−02 | −5.063E−03 | −3.506E−03 | −6.421E−03 |
| A6 | −5.326E−04 | 1.912E−03 | 1.154E−02 | 1.244E−02 | −2.029E−03 | −2.380E−03 | −1.911E−04 |
| A8 | 3.341E−04 | −8.674E−04 | −3.234E−03 | −3.247E−03 | 2.071E−03 | 1.621E−04 | 4.698E−05 |
| A10 | −4.656E−05 | 6.886E−05 | 3.084E−04 | 3.823E−04 | −6.583E−05 | −2.418E−05 | 0.000E+00 |
| A12 | 0.000E+00 | 0.000E+00 | 0.000E+00 | 0.000E+00 | 0.000E+00 | 0.000E+00 | 0.000E+00 |
| A14 | 0.000E+00 | 0.000E+00 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 | 0.000E+00 | 0.000E+00 |

|  | 9th Surface | 10th Surface | 11th Surface | 12th Surface | 13th Surface | 14th Surface | 15th Surface |
|---|---|---|---|---|---|---|---|
| k | 0.000E+00 | 0.000E+00 | −3.168E+00 | 0.000E+00 | 0.000E+00 | 0.000E+00 | −5.344E+00 |
| A4 | −1.295E−02 | −1.118E−02 | 1.642E−03 | 5.036E−03 | 5.811E−03 | −2.504E−02 | −2.118E−02 |
| A6 | −4.765E−04 | 2.866E−03 | 1.672E−03 | −5.603E−04 | −4.154E−03 | 9.899E−04 | 2.712E−03 |
| A8 | −2.737E−05 | −9.384E−04 | −6.246E−04 | −9.471E−04 | 8.805E−04 | 3.887E−04 | −2.426E−04 |
| A10 | 0.000E+00 | 6.259E−05 | 4.798E−05 | 3.025E−04 | −1.129E−04 | −5.230E−05 | 1.430E−05 |
| A12 | 0.000E+00 | 0.000E+00 | 0.000E+00 | −4.211E−05 | 8.777E−06 | 2.665E−06 | −4.662E−07 |
| A14 | 0.000E+00 | 0.000E+00 | 0.000E+00 | 2.131E−06 | −3.859E−07 | −5.665E−08 | 6.201E−09 |
| A16 | 0.000E+00 | 0.000E+00 | 0.000E+00 | 0.000E+00 | 7.448E−09 | 3.334E−10 | 0.000E+00 |

In the imaging lens in Example 6, the fifth lens L5 has positive refractive power and the sixth lens L6 has negative refractive power. As shown in Table 9, the imaging lens satisfies conditional expressions (1) to (3), conditional expressions (6) to (10), conditional expressions (13) to (16), and conditional expressions (19) and (21).

Figure 12:
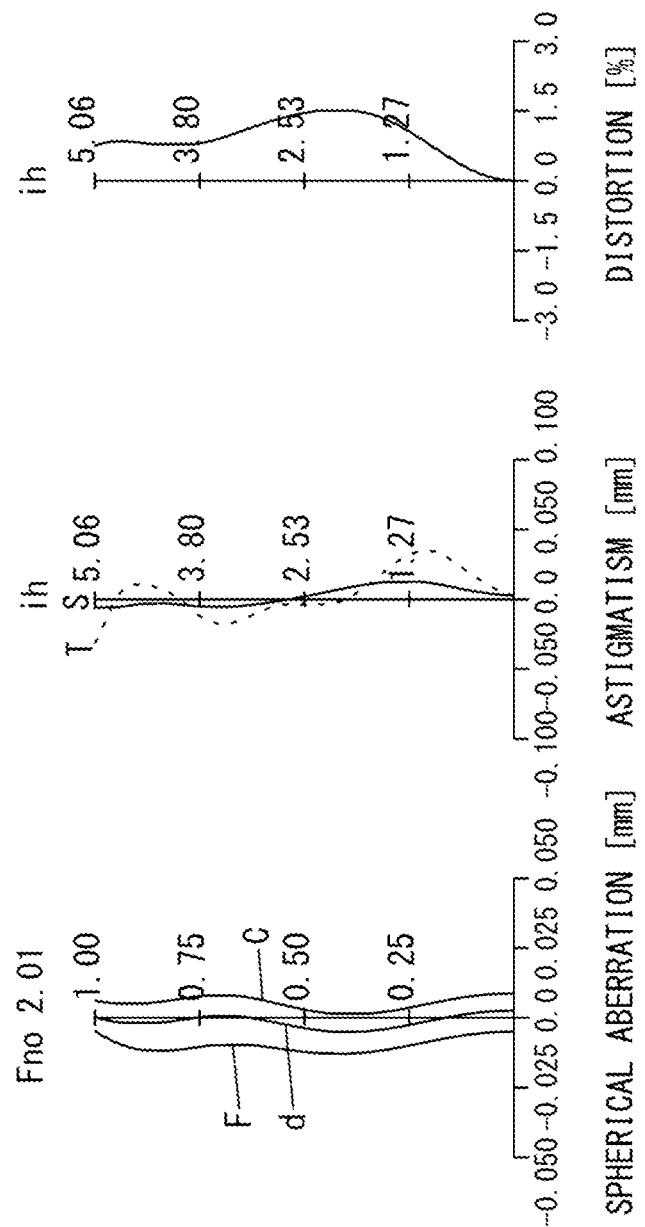
FIG. 12 shows spherical aberration, astigmatism, and distortion of the imaging lens in Example 6 according to the embodiment of the present invention.
Figure 13:
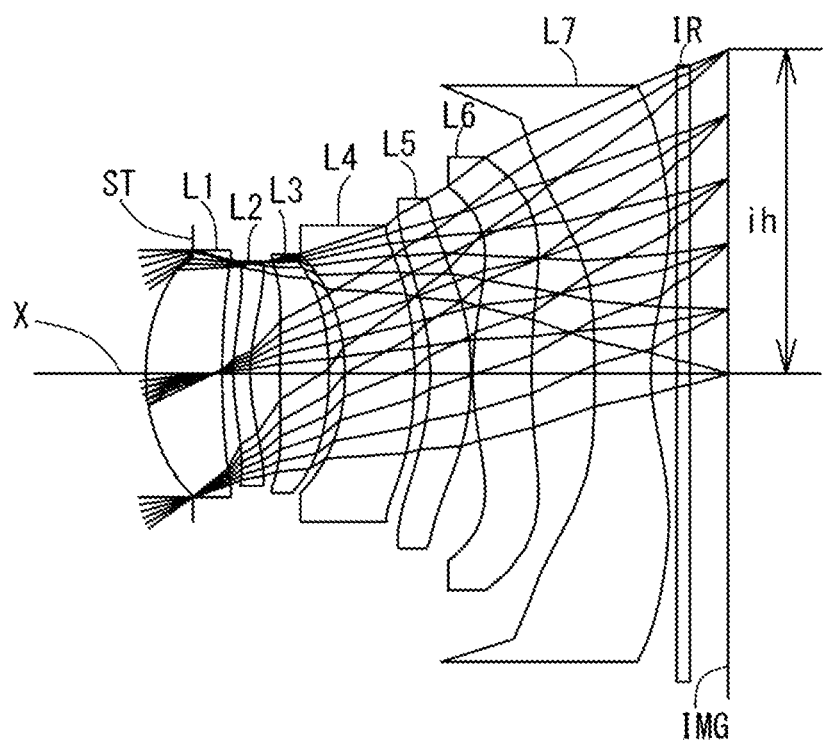
FIG. 13 is a schematic view showing the general configuration of an imaging lens in Example 7 according to the embodiment of the present invention.

FIG. 12 shows spherical aberration (mm), astigmatism (mm), and distortion (%) of the imaging lens in Example 6. As shown in FIG. 12, each aberration is corrected properly.

Example 7

The basic lens data of Example 7 is shown below in Table 7.

TABLE 7

Example 7
in mm
f = 7.04
Fno = 1.83
ω(°) = 35.5
ih = 5.06
TTL = 9.01

Surface Data

| Surface No. i | Curvature Radius r | Surface Distance d | Refractive Index Nd | Abbe Number vd |
|---|---|---|---|---|
| (Object Surface) | Infinity | Infinity |  |  |
| 1 (Stop) | Infinity | −0.734 |  |  |
| 2* | 3.085 | 1.190 | 1.5438 | 55.57 |

TABLE 7-continued

Example 7
in mm
f = 7.04
Fno = 1.83
ω(°) = 35.5
ih = 5.06
TTL = 9.01

| | | | | |
|---|---|---|---|---|
| 3* | 11.759 | 0.179 | | |
| 4* | 3.692 | 0.260 | 1.6391 | 23.25 |
| 5* | 2.891 | 0.468 | | |
| 6* | 26.089 | 0.756 | 1.5348 | 55.66 |
| 7* | −5.068 | 0.252 | | |
| 8* | −3.383 | 1.086 | 1.6391 | 23.25 |
| 9* | −6.318 | 0.242 | | |
| 10* | −4.060 | 0.638 | 1.5348 | 55.66 |
| 11* | −4.560 | 0.030 | | |
| 12* | 4.809 | 0.916 | 1.5348 | 55.66 |
| 13* | 16.148 | 0.975 | | |
| 14* | 100.000 | 0.883 | 1.5348 | 55.66 |
| 15* | 3.323 | 0.400 | | |
| 16 | Infinity | 0.210 | 1.5168 | 64.20 |
| 17 | Infinity | 0.595 | | |
| (Image Plane) | Infinity | | | |

Constituent Lens Data

| Lens | Start Surface | Focal Length |
|---|---|---|
| 1 | 2 | 7.34 (=f1) |
| 2 | 4 | −23.87 (=f2) |
| 3 | 6 | 8.00 (=f3) |
| 4 | 8 | −13.32 (=f4) |
| 5 | 10 | −124.56 (=f5) |
| 6 | 12 | 12.46 (=f6) |
| 7 | 14 | −6.45 (=f7) |

| Lens | Composite Focal Length |
|---|---|
| 3rd Lens-5th Lens | 28.94 (=f345) |
| 6th Lens-7th Lens | −22.25 (=f67) |

Aspheric Surface Data

| | 2nd Surface | 3rd Surface | 4th Surface | 5th Surface | 6th Surface | 7th Surface | 8th Surface |
|---|---|---|---|---|---|---|---|
| k | 0.000E+00 | −1.445E+01 | −8.301E+00 | −6.359E+00 | 0.000E+00 | 3.978E+00 | −5.383E+00 |
| A4 | 4.044E−03 | −4.974E−03 | −3.535E−02 | −2.547E−02 | −1.474E−02 | −7.569E−03 | −2.332E−02 |
| A6 | −3.141E−03 | −1.244E−03 | 2.668E−03 | 4.308E−03 | 3.464E−03 | −1.310E−03 | 7.453E−04 |
| A8 | 3.392E−03 | 8.003E−03 | 1.040E−02 | −5.864E−04 | −7.038E−03 | −1.548E−03 | −1.404E−03 |
| A10 | −1.779E−03 | −6.553E−03 | −1.003E−02 | −1.689E−04 | 4.593E−03 | 1.087E−03 | 8.168E−04 |
| A12 | 5.410E−04 | 2.649E−03 | 4.498E−03 | 7.675E−05 | −1.819E−03 | −2.984E−04 | −2.744E−04 |
| A14 | −8.553E−05 | −5.469E−04 | −1.043E−03 | −2.165E−05 | 4.294E−04 | 4.269E−05 | 4.760E−05 |
| A16 | 5.707E−06 | 4.528E−05 | 9.707E−05 | 2.370E−06 | −4.494E−05 | −2.475E−06 | −2.467E−06 |

| | 9th Surface | 10th Surface | 11th Surface | 12th Surface | 13th Surface | 14th Surface | 15th Surface |
|---|---|---|---|---|---|---|---|
| k | 0.000E+00 | 0.000E+00 | −1.606E+00 | −1.659E+01 | 0.000E+00 | 0.000E+00 | −6.122E−01 |
| A4 | −5.307E−03 | 6.152E−03 | −1.201E−02 | 1.017E−02 | 2.185E−02 | −2.464E−02 | −3.437E−02 |
| A6 | 3.277E−04 | 1.575E−04 | 2.232E−03 | −9.959E−03 | −1.282E−02 | 1.071E−03 | 4.544E−03 |
| A8 | −6.690E−05 | 2.602E−05 | 3.140E−04 | 2.712E−03 | 2.998E−03 | 2.646F−04 | −5.099E−04 |
| A10 | −2.278E−06 | 9.558E−07 | −1.011E−04 | −4.412E−04 | −4.338E−04 | −3.718E−05 | 4.068E−05 |
| A12 | 3.451E−06 | 9.317E−07 | 8.609E−06 | 3.639E−05 | 3.706E−05 | 1.930E−06 | −2.029E−06 |
| A14 | 6.729E−07 | 3.936E−07 | 1.316E−07 | −1.248E−06 | −1.702E−06 | −3.740E−08 | 5.488E−08 |
| A16 | 0.000E+00 | −7.412E−08 | −4.845E−08 | 7.864E−09 | 3.236E−08 | 0.000E+00 | −6.111E−10 |

In the imaging lens in Example 7, the fifth lens L5 has negative refractive power and the sixth lens L6 has positive refractive power. As shown in Table 9, the imaging lens satisfies a conditional expression (1), conditional expressions (4) to (8), conditional expressions (11) to (14), conditional expressions (17), (18), (20), and (21).

Figure 14:
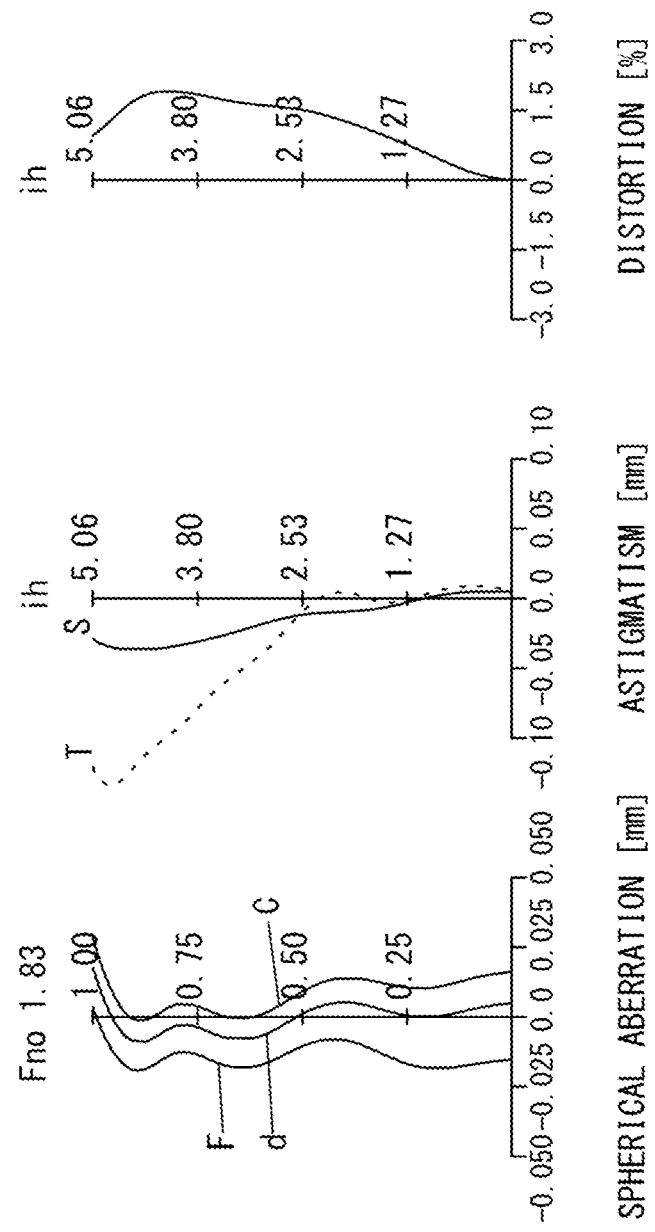
FIG. 14 shows spherical aberration, astigmatism, and distortion of the imaging lens in Example 7 according to the embodiment of the present invention.
Figure 15:
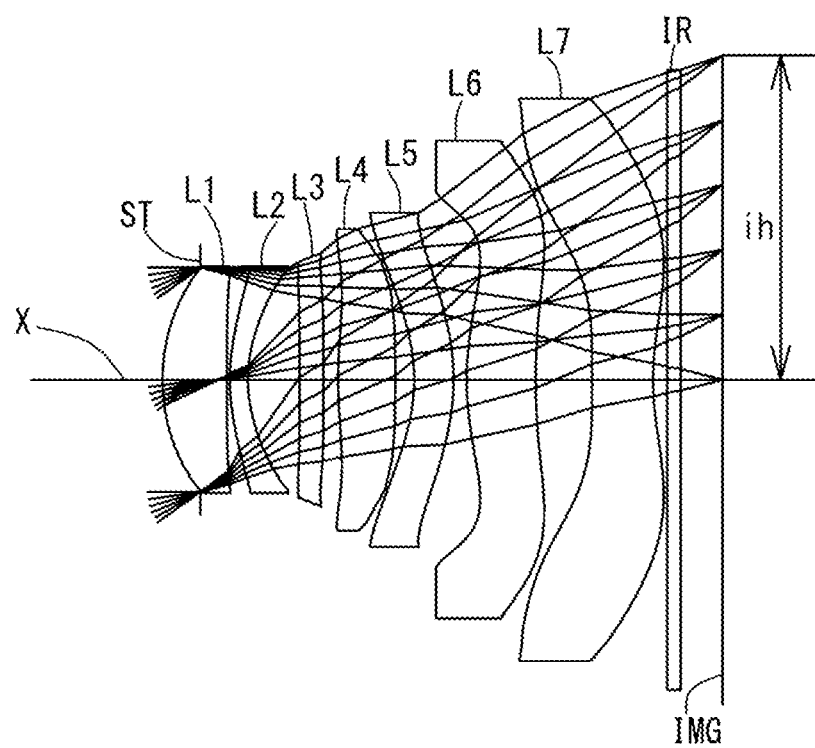
FIG. 15 is a schematic view showing the general configuration of an imaging lens in Example 8 according to the embodiment of the present invention.

FIG. 14 shows spherical aberration (mm), astigmatism (mm), and distortion (%) of the imaging lens in Example 7. As shown in FIG. 14, each aberration is corrected properly.

Example 8

The basic lens data of Example 8 is shown below in Table 8.

TABLE 8

Example 8
in mm
f = 7.05
Fno = 2.01
ω(°) = 35.5
ih = 5.06
TTL = 8.66

Surface Data

| Surface No. i | Curvature Radius r | Surface Distance d | Refractive Index Nd | Abbe Number νd |
|---|---|---|---|---|
| (Object Surface) | Infinity | Infinity | | |
| 1 (Stop) | Infinity | −0.589 | | |
| 2* | 2.968 | 1.000 | 1.5438 | 55.57 |
| 3* | 100.000 | 0.049 | | |
| 4* | 3.187 | 0.280 | 1.6391 | 23.25 |
| 5* | 2.113 | 0.807 | | |
| 6* | −100.000 | 0.375 | 1.5438 | 55.57 |
| 7* | 119.100 | 0.228 | | |
| 8* | 7.612 | 0.888 | 1.5438 | 55.57 |
| 9* | −104.117 | 0.296 | | |
| 10* | −2.842 | 0.612 | 1.6391 | 23.25 |
| 11* | −3.793 | 0.206 | | |
| 12* | 4.611 | 1.078 | 1.5438 | 55.57 |
| 13* | 12.267 | 0.878 | | |
| 14* | −67.257 | 0.950 | 1.5438 | 55.57 |
| 15* | 4.145 | 0.220 | | |
| 16 | Infinity | 0.210 | 1.5168 | 64.20 |
| 17 | Infinity | 0.655 | | |
| (Image Plane) | Infinity | | | |

Constituent Lens Data

| Lens | Start Surface | Focal Length |
|---|---|---|
| 1 | 2 | 5.60 (=f1) |
| 2 | 4 | −10.92 (=f2) |
| 3 | 6 | −99.90 (=f3) |
| 4 | 8 | 13.08 (=f4) |
| 5 | 10 | −23.68 (=f5) |
| 6 | 12 | 12.94 (=f6) |
| 7 | 14 | −7.15 (=f7) |

| Lens | Composite Focal Length |
|---|---|
| 3rd Lens-5th Lens | 44.45 (=f345) |
| 6th Lens-7th Lens | −28.24 (=f67) |

Aspheric Surface Data

| | 2nd Surface | 3rd Surface | 4th Surface | 5th Surface | 6th Surface | 7th Surface | 8th Surface |
|---|---|---|---|---|---|---|---|
| k | 0.000E+00 | 0.000E+00 | 0.000E+00 | 0.000E+00 | 0.000E+00 | 0.000E+00 | 0.000E+00 |
| A4 | 2.496E−03 | 4.159E−03 | −4.087E−02 | −5.062E−02 | 2.376E−05 | −1.152E−02 | −1.924E−02 |
| A6 | −3.122E−04 | 8.039E−04 | 1.221E−02 | 1.313E−02 | −1.758E−03 | 3.042E−04 | −6.454E−04 |
| A8 | 1.430E−04 | −2.641E−04 | −2.252E−03 | −2.530E−03 | 5.585E−04 | 4.443E−04 | 3.290E−04 |
| A10 | 0.000E+00 | 1.007E−05 | 1.153E−04 | 1.515E−04 | −2.178E−05 | 0.000E+00 | 0.000E+00 |
| A12 | 0.000E+00 | 0.000E+00 | 0.000E+00 | 0.000E+00 | 0.000E+00 | 0.000E+00 | 0.000E+00 |
| A14 | 0.000E+00 | 0.000E+00 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 | 0.000E+00 | 0.000E+00 |

| | 9th Surface | 10th Surface | 11th Surface | 12th Surface | 13th Surface | 14th Surface | 15th Surface |
|---|---|---|---|---|---|---|---|
| k | 0.000E+00 | 0.000E+00 | −7.226E−01 | 0.000E+00 | 0.000E+00 | 0.000E+00 | −4.489E+00 |
| A4 | −1.775E−02 | 1.380E−02 | 1.555E−03 | −1.257E−02 | 8.601E−03 | −2.701E−02 | −2.291E−02 |
| A6 | 5.957E−04 | 3.493E−03 | 2.550E−03 | 8.640E−04 | −4.926E−03 | 1.101E−03 | 2.499E−03 |
| A8 | −1.140E−04 | −8.567E−04 | −5.015E−04 | −1.058E−03 | 9.028E−04 | 3.866E−04 | −2.222E−04 |
| A10 | 0.000E+00 | 7.675E−05 | 4.026E−05 | 2.893E−04 | −1.127E−04 | −5.222E−05 | 1.387E−05 |

TABLE 8-continued

Example 8
in mm
f = 7.05
Fno = 2.01
ω(°) = 35.5
ih = 5.06
TTL = 8.66

| | | | | | | | |
|---|---|---|---|---|---|---|---|
| A12 | 0.000E+00 | 0.000E+00 | 0.000E+00 | −4.093E−05 | 8.856E−06 | 2.677E−06 | −4.794E−07 |
| A14 | 0.000E+00 | 0.000E+00 | 0.000E+00 | 2.179E−06 | −3.819E−07 | −5.824E−08 | 6.643E−09 |
| A16 | 0.000E+00 | 0.000E+00 | 0.000E+00 | 0.000E+00 | 6.893E−09 | 3.689E−10 | 0.000E+00 |

In the imaging lens in Example 8, the fifth lens L5 has negative refractive power and the sixth lens L6 has positive refractive power. As shown in Table 9, the imaging lens satisfies a conditional expression (1), conditional expressions (4) to (8), conditional expressions (11) to (14), and conditional expressions (17), (18), (20), and (21).

Figure 16:
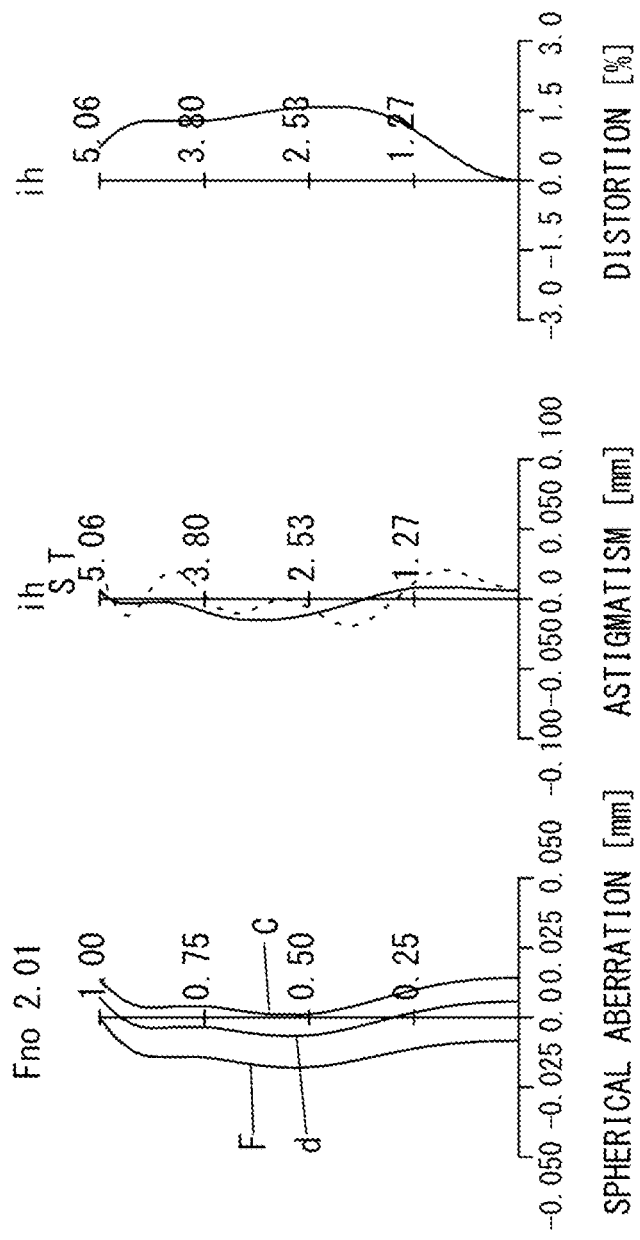
FIG. 16 shows spherical aberration, astigmatism, and distortion of the imaging lens in Example 8 according to the embodiment of the present invention.

FIG. 16 shows spherical aberration (mm), astigmatism (mm), and distortion (%) of the imaging lens in Example 8. As shown in FIG. 16, each aberration is corrected properly.

Table 9 shows data on Examples 1 to 8 relating to the conditional expressions (1) to (21).

profileness, with a ratio of total track length to diagonal length (TTL/2ih) of 0.9 or less, though they use seven constituent lenses. In addition, the imaging lenses offer a wider field of view of 70 to 75 degrees and brightness with an F-value of 2.1 or less, and correct various aberrations properly and can be manufactured at low cost.

When any one of the imaging lenses composed of seven constituent lenses in the examples according to this embodiment of the present invention is used in the image pickup device mounted in an increasingly compact and low-profile mobile terminal such as a smartphone, mobile phone, tablet

TABLE 9

| | Example 1 | Example 2 | Example 3 | Example 4 | Example 5 | Example 6 | Example 7 | Example 8 |
|---|---|---|---|---|---|---|---|---|
| Conditional Expression (1) −1.0 < f1/f2 < −0.15 | −0.55 | −0.55 | −0.55 | −0.63 | −0.57 | −0.54 | −0.31 | −0.51 |
| Conditional Expression (2) 0.5 < f5/f < 1.5 | 0.93 | 1.01 | 1.14 | 1.09 | 1.14 | 0.92 | — | — |
| Conditional Expression (3) −8.0 < f6/f < −1.0 | −3.00 | −3.54 | −4.99 | −5.07 | −4.03 | −2.98 | — | — |
| Conditional Expression (4) −20 < f5/f < −1.0 | — | — | — | — | — | — | −17.70 | −3.36 |
| Conditional Expression (5) 1.0 < f6/f < 3.0 | — | — | — | — | — | — | 1.77 | 1.84 |
| Conditional Expression (6) 20 < vd1 − vd2 < 40 | 32.32 | 32.32 | 31.60 | 32.32 | 32.32 | 32.32 | 32.32 | 32.32 |
| Conditional Expression (7) 40 < vd3 < 75 | 55.66 | 55.66 | 55.66 | 55.66 | 55.66 | 55.66 | 55.66 | 55.57 |
| Conditional Expression (8) 40 < vd7 < 75 | 55.66 | 55.66 | 55.66 | 55.66 | 55.66 | 55.66 | 55.66 | 55.57 |
| Conditional Expression (9) 40 < vd4 < 75 | 55.66 | 55.66 | 55.66 | 55.66 | 55.66 | 55.66 | — | — |
| Conditional Expression (10) 20 < \| vd5 − vd6 \| < 40 | 30.09 | 30.09 | 29.99 | 29.99 | 29.99 | 30.09 | — | — |
| Conditional Expression (11) 20 < \| vd4 − vd5 \| < 40 | — | — | — | — | — | — | 32.41 | 32.32 |
| Conditional Expression (12) 40 < vd6 < 75 | — | — | — | — | — | — | 55.66 | 55.57 |
| Conditional Expression (13) 1.0 < TTL/f < 1.35 | 1.28 | 1.24 | 1.23 | 1.24 | 1.24 | 1.25 | 1.28 | 1.23 |
| Conditional Expression (14) TTL/2ih < 1.0 | 0.84 | 0.89 | 0.86 | 0.86 | 0.86 | 0.87 | 0.89 | 0.86 |
| Conditional Expression (15) 0.4 < f345/f < 1.2 | 0.78 | 0.84 | 0.88 | 0.83 | 0.87 | 0.85 | — | — |
| Conditional Expression (16) −1.0 < f67/f < −0.3 | −0.59 | −0.60 | −0.67 | −0.64 | −0.65 | −0.60 | — | — |
| Conditional Expression (17) 2.0 < f345/f < 8.0 | — | — | — | — | — | — | 4.11 | 6.30 |
| Conditional Expression (18) −6.0 < f67/f < −2.0 | — | — | — | — | — | — | −3.16 | −4.00 |
| Conditional Expression (19) 0.8 < (r9 + r10)/(r9 − r10) < 2.5 | 1.61 | 1.63 | 2.10 | 1.92 | 2.02 | 0.97 | — | — |
| Conditional Expression (20) −20.0 < (r9 + r10)/(r9 − r10) < −4.0 | — | — | — | — | — | — | −17.23 | −6.98 |
| Conditional Expression (21) f/EPD < 2.40 | 1.64 | 1.78 | 1.73 | 2.08 | 2.08 | 2.01 | 1.83 | 2.01 |

As explained so far, the imaging lenses in the examples according to this embodiment of the present invention are low-profile enough to meet the growing demand for lowor PDA (Personal Digital Assistant), a game console, an information terminal such as a PC, or a highly functional product such as a home appliance with a camera function, it contributes to the compactness of the image pickup device and provides high camera performance.

The effects of the present invention are as follows.

According to the present invention, there is provided a compact low-cost imaging lens which meets the demand for low-profileness, offers high brightness and a wide field of view and corrects various aberrations properly.

What is claimed is:

1. An imaging lens configured to form an image of an object on a solid-state image sensor, in which the lenses are arranged in order from an object side to an image side of the imaging lens and are spaced from each other, the imaging lens comprising:

a first lens with a positive refractive power;
a second lens with a negative refractive power;
a third lens with a positive or a negative refractive power;
a fourth lens with a positive or a negative refractive power;
a fifth lens with a positive refractive power having a concave surface facing the object side near an optical axis and a convex surface facing the image side near the optical axis;
a sixth lens with a positive or a negative refractive power; and
a seventh lens with a negative refractive power, the seventh lens being a double-sided aspheric lens having a concave surface facing the object side near the optical axis and a concave surface facing the image side near the optical axis, wherein
the third lens, the fourth lens, the fifth lens, and the sixth lens each have at least one aspheric surface,
the seventh lens has a pole-change point spaced from an optical axis of the imaging lens on its aspheric image-side surface, and
an expression (6) is satisfied:

$$20 < vd1 - vd2 < 40, \text{ where} \tag{6}$$

vd1: abbe number of the first lens at d-ray, and
vd2: abbe number of the second lens at d-ray.

2. The imaging lens according to claim 1, wherein an expression (1) is satisfied:

$$-1.0 < f1/f2 < -0.15, \text{ where} \tag{1}$$

f1: a focal length of the first lens, and
f2: a focal length of the second lens.

3. The imaging lens according to claim 1, wherein an expression (7) is satisfied:

$$40 < vd3 < 75, \text{ where} \tag{7}$$

vd3: abbe number of the third lens at d-ray.

4. The imaging lens according to claim 1, wherein an expression (8) is satisfied:

$$40 < vd7 < 75, \text{ where} \tag{8}$$

vd7: abbe number of the seventh lens at d-ray.

5. The imaging lens according to claim 1, wherein an expression (9) is satisfied:

$$40 < vd4 < 75, \text{ where} \tag{9}$$

vd4: abbe number of the fourth lens at d-ray.

6. The imaging lens according to claim 1, wherein an expression (10) is satisfied:

$$20 < |vd5 - vd6| < 40, \text{ where} \tag{10}$$

vd5: abbe number of the fifth lens at d-ray, and
vd6: abbe number of the sixth lens at d-ray.

7. The imaging lens according to claim 1, wherein an expression (13) is satisfied:

$$1.0 < TTL/f < 1.35, \text{ where} \tag{13}$$

f: an overall focal length of the imaging lens, and
TTL: a distance along the optical axis from an image plane of the imaging lens to an object-side surface of an optical element located nearest an imaged object.

8. The imaging lens according to claim 1, wherein an expression (14) is satisfied:

$$TTL/2ih < 1.0, \text{ where} \tag{14}$$

TTL: a distance along the optical axis from an image plane of the imaging lens to an object-side surface of an optical element located nearest an imaged object, and
ih: a maximum image height.

9. The imaging lens according to claim 1, wherein an expression (19) is satisfied:

$$0.8 < (r9 + r10)/(r9 - r10) < 2.5, \text{ where} \tag{19}$$

r9: curvature radius of the object-side surface of the fifth lens, and
r10: curvature radius of the image-side surface of the fifth lens.

10. The imaging lens according to claim 1, wherein an expression (21) is satisfied:

$$f/EPD < 2.40, \text{ where} \tag{21}$$

f: an overall focal length of the imaging lens, and
EPD: entrance pupil diameter.

11. The imaging lens according to claim 1, wherein an expression (2) is satisfied:

$$0.5 < f5/f < 1.5, \text{ where} \tag{2}$$

f: an overall focal length of the imaging lens, and
f5: a focal length of the fifth lens.

* * * * *